United States Patent
Morita et al.

(10) Patent No.: US 8,290,530 B2
(45) Date of Patent: Oct. 16, 2012

(54) RADIO COMMUNICATION METHOD AND RADIO BASE STATION

(75) Inventors: Kugo Morita, Yokohama (JP); Susumu Kashiwase, Yokohama (JP)

(73) Assignee: Kyocera Corporation, Kyoto (JP)

( * ) Notice: Subject to any disclaimer, the term of this patent is extended or adjusted under 35 U.S.C. 154(b) by 933 days.

(21) Appl. No.: 12/375,401

(22) PCT Filed: Jul. 27, 2007

(86) PCT No.: PCT/JP2007/064815
§ 371 (c)(1),
(2), (4) Date: Jan. 27, 2009

(87) PCT Pub. No.: WO2008/013286
PCT Pub. Date: Jan. 31, 2008

(65) Prior Publication Data
US 2009/0325623 A1 Dec. 31, 2009

(30) Foreign Application Priority Data
Jul. 28, 2006 (JP) .................. 2006-207252

(51) Int. Cl.
*H04B 7/00* (2006.01)
(52) U.S. Cl. .............. 455/522; 455/115.1; 455/13.4; 455/67.11; 455/67.13
(58) Field of Classification Search .......... 455/522, 455/69, 13.4, 115.1, 115.3, 67.11, 67.13, 455/135, 161.3, 226.3, 450, 425.2, 453, 509, 455/561; 370/252, 332, 331, 328, 337, 345, 370/241, 329, 281, 280
See application file for complete search history.

(56) References Cited

U.S. PATENT DOCUMENTS

| | | | |
|---|---|---|---|
| 6,597,668 B1 * | 7/2003 | Schafer et al. | 370/280 |
| 7,860,511 B1 * | 12/2010 | Fong et al. | 455/453 |
| 8,064,409 B1 * | 11/2011 | Gardner et al. | 370/335 |
| 2002/0122402 A1 * | 9/2002 | Periyalwar et al. | 370/342 |
| 2005/0186922 A1 * | 8/2005 | Nakayama | 455/126 |
| 2005/0250502 A1 * | 11/2005 | Laroia et al. | 455/447 |
| 2010/0016010 A1 * | 1/2010 | Kashiwase et al. | 455/522 |
| 2010/0061480 A1 * | 3/2010 | Kashiwase et al. | 375/295 |
| 2010/0323642 A1 * | 12/2010 | Morita | 455/115.3 |

FOREIGN PATENT DOCUMENTS

| | | |
|---|---|---|
| JP | 11-196043 | 7/1999 |
| JP | 2004-260692 | 9/2004 |

OTHER PUBLICATIONS

Cdma 2000 High Rate Packet Data Air Interface 3GPP2 C.S. 0024 Version 1.0, 3GPP2, Jun. 2006.

* cited by examiner

*Primary Examiner* — Tan Trinh
(74) *Attorney, Agent, or Firm* — DLA Piper LLP (US)

(57) ABSTRACT

A radio communication method includes the steps of: calculating a transmission power difference between a first carrier and a second carrier; determining whether or not the transmission power difference exceeds a threshold set up on the basis of a maximum transmission power difference allowable between the first carrier and the second carrier; and stopping transmission of power control information being an instruction to increase transmission power of the carrier having higher transmission power out of the first carrier and the second carrier when the transmission power difference exceeds the threshold set up on the basis of the maximum transmission power difference.

8 Claims, 12 Drawing Sheets

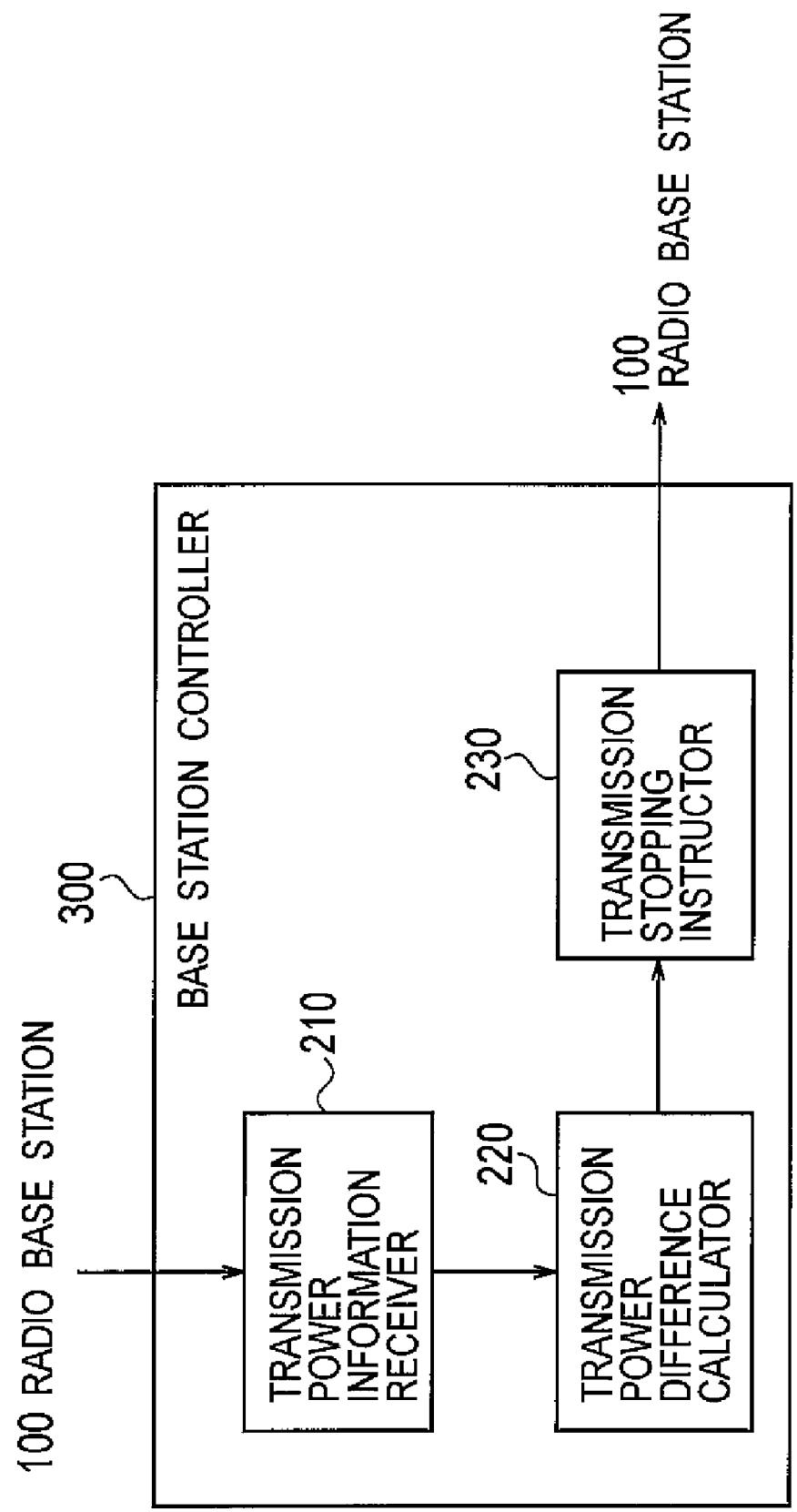

RADIO COMMUNICATION METHOD AND RADIO BASE STATION

CROSS-REFERENCE TO THE RELATED APPLICATIONS

This application is a national stage of international application No. PCT/JP2007/064815 filed Jul. 27, 2007, which also claims the benefit of priority under 35 UCS 119 to Japanese Patent Application No. 2006-207252 filed Jul. 28, 2006, the entire contents of which are incorporated herein by reference.

TECHNICAL FIELD

The present invention relates to a radio communication method in reverse link by multicarrier using multiple carriers, and also to a radio base station connected to a radio communication terminal by the multicarrier.

BACKGROUND ART

In recent years, as applications, such as moving images or games, to be handled have been diversified and sophisticated, the data transmission rate in a mobile communication system has been strongly demanded to be speeded up. With such a background, the Third Generation Partnership Project 2 (3GPP2), for example, defines a scheme for implementing high speed data transmissions by using multiple carriers bundled in an upper layer (so-called multicarrier).

In the case of multicarrier, a radio communication terminal (Access Terminal) generally employs a configuration in which multiple carriers are transmitted by use of a single radio communication network, in view of downsizing, reduction in manufacturing cost or the like. Thus, in order to reduce interference between adjacent carriers that are adjacent to each other with a predetermined frequency interval (1.25 MHz interval), it is provided that a transmission power difference between adjacent carriers should be within a predetermined threshold (MaxRLTxPwrDiff, 15 dB, for example) (Non-patent document 1, for example).

Non-patent document 1: "cdma2000 High Rate Packet Data Air Interface 3GPP2 C.S0024-B Version 1.0", 3GPP2, June 2006

DISCLOSURE OF THE INVENTION

Problems to be Solved by the Invention

As described above, 3GPP2 provides that a transmission power difference between adjacent carriers be controlled to be within a predetermined threshold (MaxRLTxPwrDiff). In some cases, however, the transmission power difference cannot be maintained within the predetermined threshold under some communication conditions between a radio communication terminal and a radio base station (Access Network).

For example, when a radio communication terminal moves away from a first radio base station that is currently performing communications by use of a first carrier and simultaneously moves toward a second radio base station that is currently performing communications by use of a second carrier adjacent to the first carrier with a predetermined frequency interval, the radio communication terminal needs to increase the transmission power of the first carrier to maintain communications with the first radio base station using the first carrier. In addition, as the radio communication terminal comes closer to the second radio base station, it reduces the transmission power of the second carrier.

In this way, in some cases, the radio communication terminal may not be able to maintain the transmission power difference within the predetermined threshold to maintain communications currently being performed with the first radio base station and the second radio base station.

Hence, the present invention has been made in light of such the circumstances, and it is an objective of the present invention to provide a radio communication method and a radio base station that are capable of maintaining communications by multicarrier, while preventing interference between adjacent carriers which are adjacent to each other with a predetermined frequency interval.

An aspect of the present invention provides a radio communication method in reverse link by multicarrier using at least a first carrier and a second carrier adjacent to the first carrier with a predetermined frequency interval. The radio communication method includes the steps of: generating power control information being an instruction to increase or decrease transmission power of the first carrier on the basis of reception quality of reverse link data using the first carrier, and transmitting the generated power control information to a radio communication terminal connected via the first carrier; generating power control information being an instruction to increase or decrease transmission power of the second carrier on the basis of reception quality of reverse link data using the second carrier, and transmitting the generated power control information to a radio communication terminal connected via the second carrier; acquiring a transmission power value of the first carrier from the radio communication terminal connected via the first carrier; acquiring a transmission power value of the second carrier from the radio communication terminal connected via the second carrier; calculating a transmission power difference between the first carrier and the second carrier on the basis of the transmission power value of the first carrier and the transmission power value of the second carrier; and determining whether or not the transmission power difference exceeds a threshold set up on the basis of a maximum transmission power difference allowable between the first carrier and the second carrier. In the radio communication method, in the steps of transmitting the power control information, transmission of the power control information being an instruction to increase the transmission power of the carrier having higher transmission power out of the first carrier and the second carrier is stopped when the transmission power difference exceeds the threshold set up on the basis of the maximum transmission power difference.

According to this aspect, when the transmission power difference exceeds the threshold set up on the basis of the maximum transmission power difference, it is possible to maintain communications by multicarrier while suppressing interference between the adjacent carriers adjacent to each other with the predetermined frequency interval by stopping transmission of the power control information being an instruction to increase the transmission power of the carrier having higher transmission power out of the first carrier and the second carrier.

Another aspect of the present invention provides the above-mentioned aspect of the present invention, in which: the transmission power difference is calculated in a predetermined cycle in the step of calculating the transmission power difference; the radio communication method further includes the step of determining whether or not the transmission power difference is increasing on the basis of the transmission power difference calculated in the predetermined cycle; and, in the steps of transmitting the power control information, transmission of the power control information being an instruction to increase the transmission power of the carrier having higher transmission power is stopped when it is determined that the transmission power difference is increasing.

Another aspect of the present invention provides a radio communication method in reverse link by multicarrier using at least a first carrier and a second carrier adjacent to the first carrier with a predetermined frequency interval. The radio communication method includes the steps of: generating power control information being an instruction to increase or decrease transmission power of the first carrier on the basis of reception quality of reverse link data using the first carriers and transmitting the generated power control information to a radio communication terminal connected via the first carrier; generating power control information being an instruction to increase or decrease transmission power of the second carrier on the basis of reception quality of reverse link data using the second carrier, and transmitting the generated power control information to a radio communication terminal connected via the second carrier; acquiring a transmission power value of the first carrier from the radio communication terminal connected via the first carrier; acquiring a transmission power value of the second carrier from the radio communication terminal connected via the second carrier; calculating a transmission power difference between the first carrier and the second carrier on the basis of the transmission power value of the first carrier and the transmission power value of the second carrier; and determining whether or not the transmission power difference exceeds a threshold set up on the basis of a maximum transmission power difference allowable between the first carrier and the second carrier. In the radio communication method, in the steps of transmitting the power control information, transmission of the power control information being an instruction to decrease the transmission power of the carrier having lower transmission power out of the first carrier and the second carrier is stopped when the transmission power difference exceeds the threshold set up on the basis of the maximum transmission power difference.

According to this aspect, when the transmission power difference exceeds the threshold set up on the basis of the maximum transmission power difference, it is possible to maintain communications by multicarrier while suppressing interference between the adjacent carriers adjacent to each other with the predetermined frequency interval by stopping transmission of the power control information being an instruction to decrease the transmission power of the carrier having lower transmission power out of the first carrier and the second carrier.

Another aspect of the present invention provides the above-mentioned aspect of the present invention, in which: the transmission power difference is calculated in a predetermined cycle in the step of calculating the transmission power difference; the radio communication method further includes the step of determining whether or not the transmission power difference is increasing on the basis of the transmission power difference calculated in the predetermined cycle; and, in the steps of transmitting the power control information, transmission of the power control information being an instruction to decrease the transmission power of the carrier having lower transmission power is stopped when it is determined that the transmission power difference is increasing.

Another aspect of the present invention provides a radio base station connected to radio communication terminals by multicarrier using at least a first carrier and a second carrier adjacent to the first carrier with a predetermined frequency interval. The radio base station includes: a first transmitter (a power control information transmitter 150) configured to generate power control information being an instruction to increase or decrease transmission power of the first carrier on the basis of reception quality of reverse link data using the first carrier, and to transmit the generated power control information to the radio communication terminal connected via the first carrier; a second transmitter (the power control information transmitter 150) configured to generate power control information being an instruction to increase or decrease transmission power of the second carrier on the basis of reception quality of reverse link data using the second carrier, and to transmit the generated power control information to the radio communication terminal connected via the second carrier; an acquisition unit (a receiver 110) configured to acquire a transmission power value of the first carrier from any of the radio communication terminals connected via the first carrier, and to acquire a transmission power value of the second carrier from any of the radio communication terminals connected via the second carrier; a transmission power difference calculator (a transmission power difference calculator 120) configured to calculate a transmission power difference between the first carrier and the second carrier on the basis of the transmission power value of the first carrier and the transmission power value of the second carrier; and a transmission power difference determination unit (the transmission power difference calculator 120) configured to determine whether or not the transmission power difference calculated by the transmission power difference calculator exceeds a threshold set up on the basis of a maximum transmission power difference allowable between the first carrier and the second carrier. In the radio base station, any of the first transmitter and the second transmitter stops transmission of the power control information being an instruction to increase the transmission power of the carrier having higher transmission power when the transmission power difference exceeds the threshold set up on the basis of the maximum transmission power difference.

Another aspect of the present invention provides the above-mentioned aspect of the present invention, in which: the transmission power difference calculator calculates the transmission power difference in a predetermined cycle; the radio base station further includes a power difference determination unit (a transmission power difference determination unit 160) which determines whether or not the transmission power difference is increasing on the basis of the transmission power difference calculated in the predetermined cycle by the transmission power difference calculator; and any of the first transmitter and the second transmitter stops transmission of the power control information being an instruction to increase the transmission power of the carrier having higher transmission power when it is determined by the power difference determination unit that the transmission power difference is increasing.

Another aspect of the present invention provides a radio base station connected to radio communication terminals by multicarrier using at least a first carrier and a second carrier adjacent to the first carrier with a predetermined frequency interval. The radio base station includes: a first transmitter (a power control information transmitter 150) configured to generate power control information being an instruction to increase or decrease transmission power of the first carrier on the basis of reception quality of reverse link data using the first carrier, and to transmit the generated power control information to the radio communication terminal connected via the first carrier; a second transmitter (the power control information transmitter 150) configured to generate power control information being an instruction to increase or decrease transmission power of the second carrier on the basis of reception quality of reverse link data using the second carrier, and to transmit the generated power control information to the radio communication terminal connected via the second carrier; an acquisition unit (a receiver 110) configured to acquire a transmission power value of the first carrier from any of the radio communication terminals connected via the first carrier, and to acquire a transmission power value of the second carrier from any of the radio communication terminals connected via the second carrier; a transmission power difference calculator (a transmission power difference calculator 120) configured to calculate a transmission power difference between the first carrier and the second carrier on the basis of the transmission power value of the first carrier and the transmission power value of the second carrier; and a transmission power difference determination unit (the transmission power difference calculator 120) configured to determine whether or not the transmission power difference calculated by the transmission power difference calculator exceeds a threshold set up on the basis of a maximum transmission power difference allowable between the first carrier and the second carrier. In the radio base station, any of the first transmitter and the second transmitter stops transmission of the power control information being an instruction to decrease the transmission power of the carrier having lower transmission power when the transmission power difference exceeds is the threshold set up on the basis of the maximum transmission power difference.

Another aspect of the present invention provides the above-mentioned aspect of the present invention, in which: the transmission power difference calculator calculates the transmission power difference in a predetermined cycle; the radio base station further includes a power difference determination unit (a transmission power difference determination unit 160) which determines whether or not the transmission power difference is increasing on the basis of the transmission power difference calculated in the predetermined cycle by the transmission power difference calculator; and any of the first transmitter and the second transmitter stops transmission of the power control information being an instruction to decrease the transmission power of the carrier having lower transmission power when it is determined by the power difference determination unit that the transmission power difference is increasing.

According to the characteristics of the present invention, it is possible to provide a radio communication method and a radio base station that can maintain communications by multicarrier while interference between adjacent carriers that are adjacent to each other with a predetermined frequency interval is controlled.

BRIEF DESCRIPTION OF THE DRAWINGS

FIG. 12 is a functional block configuration diagram of a base station controller 200 according to a third embodiment of the present invention.

BEST MODE FOR CARRYING OUT THE INVENTION

Figure 1:
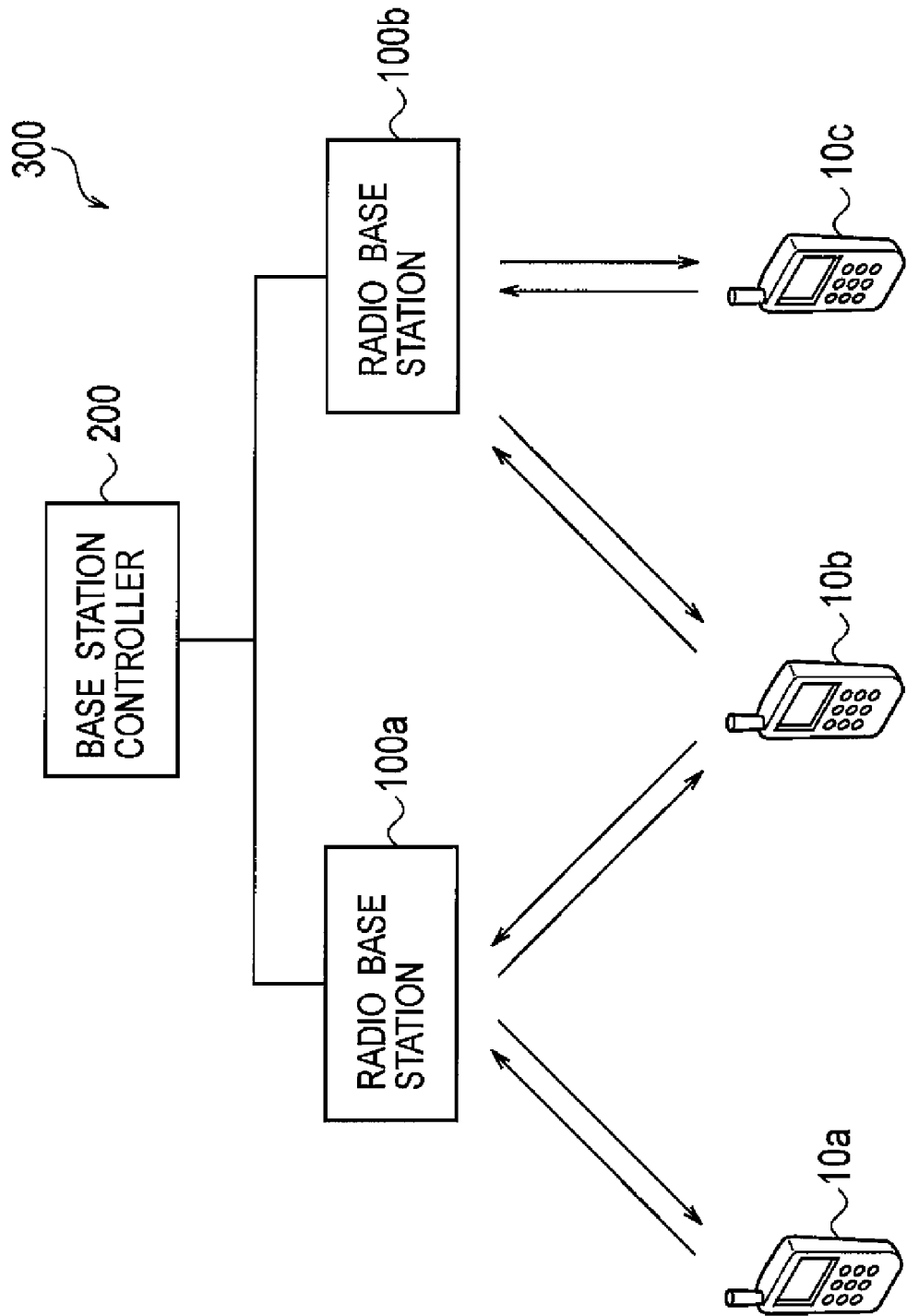
FIG. 1 is a view showing an overall schematic configuration of a communication system 300 according to a first embodiment of the present embodiment.

Next, embodiments of the present invention will be described. In the following description of the drawings, a same or similar reference numeral is given to a same or similar part. However, it should be noted that the drawings are schematic and the ratio of each dimension differs from actual ratio.

Thus, specific dimensions and the like are to be determined by referring to the following description. In addition, a relationship or a ratio of mutual dimensions may differ among the drawings, as a matter of course.

First Embodiment (Overall Schematic Configuration of Communication System)

An overall schematic configuration of a communication system according to a first embodiment of the present embodiment will be described hereinafter with reference to the drawings. FIG. 1 shows an overall schematic configuration of a communication system 300 according to the first embodiment of the present embodiment.

As shown in FIG. 1, the communication system 300 includes multiple radio communication terminals 10 (a radio communication terminal 10a to a radio communication terminal 10c), multiple radio base stations 100 (a radio base station 100a and a radio base station 100b), and a base station controller 200.

Each of the radio communication terminals 10 transmits reverse link data to each of the radio base stations 100 by using a reverse link frequency band assigned for transmitting the reverse link data. Specifically, the reverse link frequency band is divided into multiple carriers. Then, the radio communication terminal 10 transmits the reverse link data to the base radio base station 100 by using the multiple carriers bundled in an upper layer (multicarrier).

In addition, the radio communication terminal 10 receives forward link data from the radio base station 100 by using a forward link frequency band assigned for transmitting the forward link data. Specifically, the forward link frequency band is divided into multiple carriers. Then, the radio communication terminal 10 receives the forward link data from the radio base station 100 by using the multiple carriers bundled in an upper layer (multicarrier).

Note that the radio communication terminal 10, as in the case of the radio communication terminal 10*a* or the radio communication terminal 10*c*, may communicate with a single radio base station 100. In addition, the radio communication terminal 10 may communicate with multiple radio base stations 100, as in the case of the radio communication terminal 10*b*.

The radio base station 100 receives the reverse link data from the radio communication terminal 10 by using the reverse link frequency band assigned for transmitting the reverse link data. The radio base station 100 also transmits the forward link data to the radio communication terminals 10 by using the forward link frequency band assigned for transmitting the forward link data.

The base station controller 200 controls communications made between the radio communication terminals 10 and the radio base stations 100. The base station controller 200 performs operations such as handoff in which the radio communication terminal 10 switches one radio base station 100 for communicating therewith to the other.

In the communication system 300, the radio communication terminal 10 performs open loop control in which transmission power of reverse link data is controlled on the basis of received power of forward link data received from the radio base station 100. The radio communication terminal 10 also performs closed loop control in which transmission power of reverse link data is controlled on the basis of power control information received from the radio base station 100. The power control information herein is information that the radio base station 100 generates on the basis of reception quality (for example, signal to interference ratio (SIR)) of the reverse link data received from the radio communication terminal 10.

(Reverse Link Frequency Band)

Figure 2:
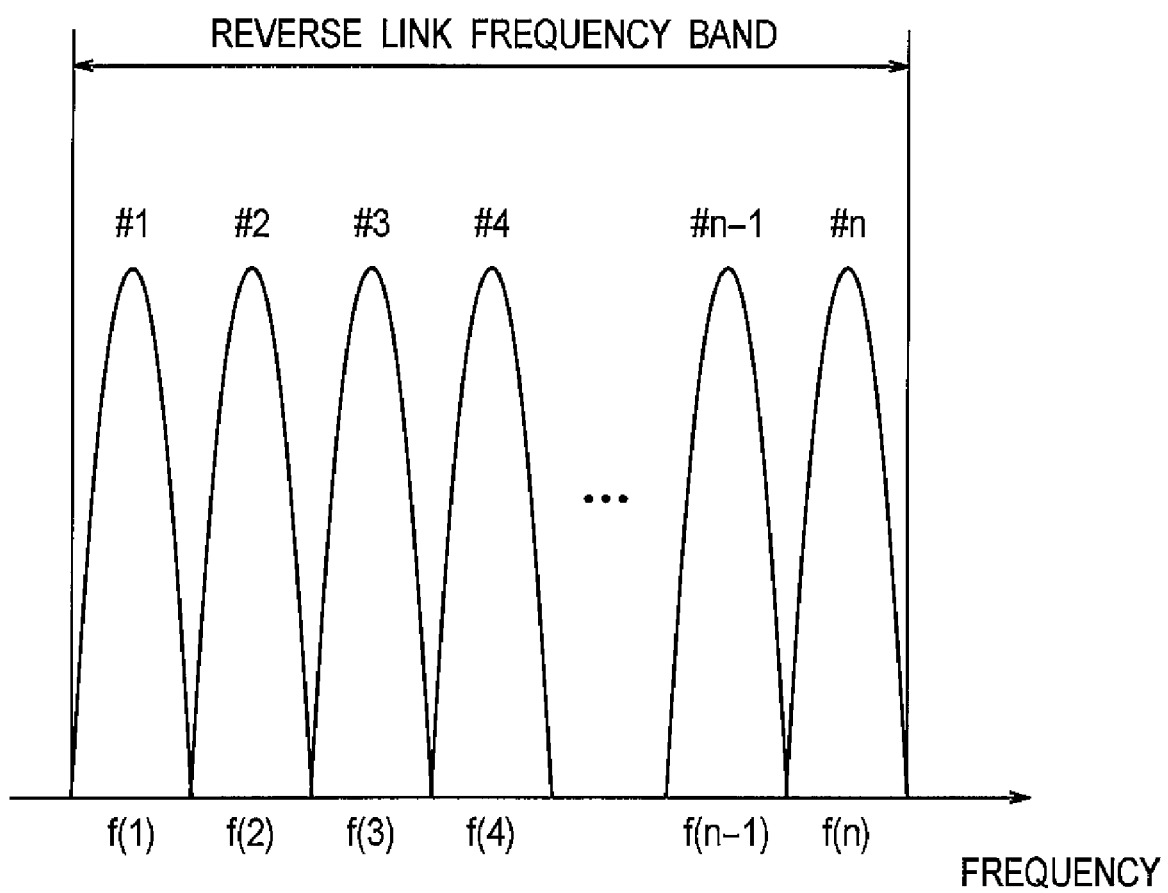
FIG. 2 is a graph showing frequency bandwidth in reverse link according to the first embodiment of the present invention.

A reverse link frequency band according to the first embodiment of the present invention will be described hereinafter with reference to the drawings. FIG. 2 shows the reverse link frequency band according to the first embodiment of the present invention.

As shown in FIG. 2, the reverse link frequency band is divided into multiple carriers (carrier #1 to carrier #n). In addition, center frequencies of the carriers are f(1) to f(n), respectively. The center frequencies of the carriers are adjacent to each other being spaced apart at a predetermined frequency interval (e.g., 1.25 MHz). Two carriers having their center frequencies being adjacent to each other will be hereinafter referred to as adjacent carriers.

(Configuration of Radio Communication Terminal)

Figure 3:
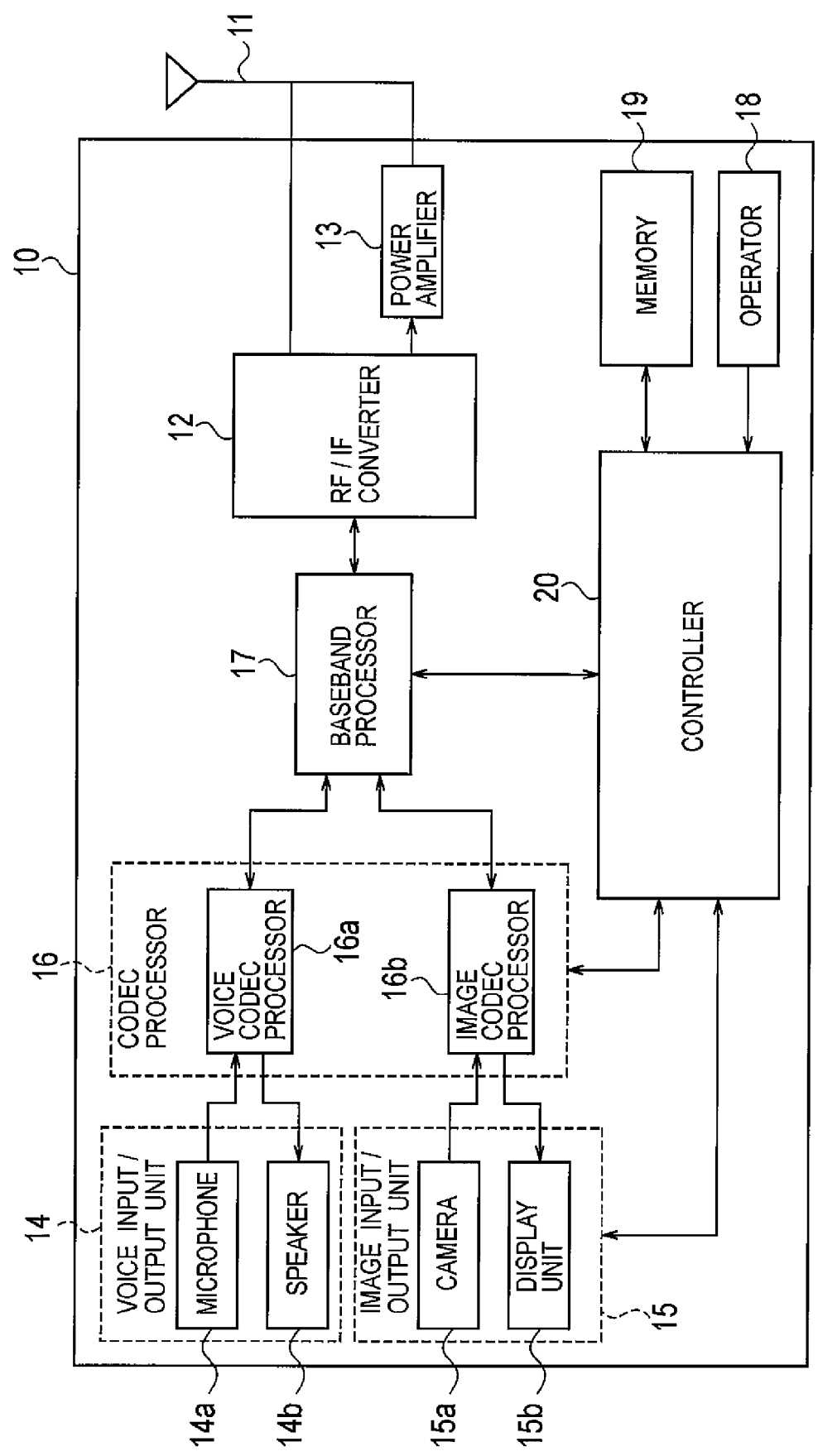
FIG. 3 is a block configuration diagram of a radio communication terminal 10 according to the first embodiment of the present invention.

A configuration of the radio communication terminal according to the first embodiment of the present invention will be described hereinafter with reference to the drawings. FIG. 3 is a functional block configuration diagram showing the radio communication terminal 10 according to the first embodiment of the present invention. Since the radio communication terminals 10*a* to 10*c* have similar configurations, they will be collectively referred to as a radio communication terminal 10 in the following description.

As shown in FIG. 3, the radio communication terminal 10 includes an antenna 11, an RF/IF converter 12, a power amplifier 13, a voice input/output unit 14, an image input/output unit 15, a codec processor 16, a baseband processor 17, an operator 18, a memory 19, and a controller 20.

The antenna 11 receives a signal (a reception signal) transmitted by the radio base stations 100. The antenna 11 also transmits a signal (a transmission signal) to the radio base station 100.

The RF/IF converter 12 converts a frequency (Radio Frequency (RF)) of a reception signal received by the antenna 11 into a frequency (Intermediate Frequency (IF)) to be handled by the baseband processor 17. The RF/IF converter 12 also converts the frequency (IF) of a transmission signal acquired from the baseband processor 17 into the frequency (RF) to be used in radio communications. In addition, the RF/IF converter 12 inputs the transmission signal converted into the radio frequency (RF) to the power amplifier 13.

The power amplifier 13 amplifies the transmission signal acquired from the RF/IF converter 12. The amplified transmission signal is inputted to the antenna 11.

The voice input/output unit 14 has a microphone 14*a* for collecting voice and a speaker 14*b* for outputting voice. The microphone 14*a* inputs a voice signal into the codec processor 16 on the basis of the collected voice. The speaker 14*b* outputs voice on the basis of the voice signal acquired from the codec processor 16.

The image input/output unit 15 includes a camera 15*a* for capturing an object, and a display unit 15*b* for displaying characters, images, and the like. The camera 15*a* inputs an image signal to the codec processor 16 on the basis of captured images (still images and moving images). The display unit 15*b* displays images on the basis of the image signal acquired from the codec processor 16. The display unit 15*b* also displays characters to be inputted through the operator 18.

The codec processor 16 includes: a voice codec processor 16*a* for encoding and decoding a voice signal according to a predetermined encoding scheme (EVRC (Enhanced Variable Rate Codec), AMR (Advanced Multi Rate Codec) or G.729 compliant with ITU-T, for example); and an image codec processor 16*b* for encoding and decoding an image signal according to a predetermined encoding scheme (MPEG-4, for example).

The voice codec processor 16*a* encodes a voice signal acquired from the voice input/output unit 14. The voice codec processor 16*a* also decodes a voice signal acquired from the baseband processor 17. The image codec processor 16*b* encodes an image signal acquired from the image input/output unit 15. The image codec processor 16*b* also decodes an image signal acquired from the baseband processor 17.

The baseband processor 17 modulates a transmission signal or demodulates a reception signal according to a predetermined modulation scheme (QPSK or 16QAM) or the like. Specifically, the baseband processor 17 modulates a baseband signal such as a voice signal or an image signal acquired from the codec processor 16. The modulated baseband signal (transmission signal) is inputted into the RF/IF converter 12. The baseband processor 17 also demodulates a reception signal acquired from the RF/IF converter 12. The demodulated reception signal (baseband signal) is inputted into the codec processor 16.

The baseband processor 17 modulates information generated by the controller 20. The modulated information (transmission signal) is inputted into the RF/IF converter 12. The baseband processor 17 also demodulates a reception signal acquired from the RF/IF converter 12. The demodulated reception signal is inputted into the controller 20.

The operator 18 is a group of keys formed of input keys for allowing characters, digits, and the like to be inputted, a response key for responding to incoming calls (calling), a calling key for outgoing calls (originating call), and the like. In addition, when each key is pressed, the operator 18 allows an input signal corresponding to the pressed key to be inputted to the controller 20.

The memory 19 stores therein a program for controlling operation of the radio communication terminal 10, various types of data such as incoming and outgoing call history, an address book, and the like. The memory 19 is formed of, for example, a flash memory that is a nonvolatile semiconductor memory, or a SRAM (Static Random Access Memory) that is a volatile semiconductor memory, or the like.

The controller 20 controls operations of the radio communication terminal 10 (the image input/output unit 15, the codec processor 16, the baseband processor 17, etc.) according to the program stored in the memory 19.

For example, the controller 20 controls transmission power is of reverse link data for each carrier. Specifically, the controller 20 controls the transmission power of the reverse link data on the basis of reception quality (SIR, for example) of forward link data received from the radio base stations 100 to which the reverse link data is transmitted (open loop control).

The controller 20 also controls transmission power of reverse link data on the basis of power control information received from the radio base stations 100 to which the reverse link data is transmitted (closed loop control). Note that, as described above, the power control information is information that the radio base station 100 generates on the basis of reception quality (SIR, for example) of the reverse link data. The power control information requires the decrease or increase in the transmission power for the reverse link data.

Moreover, the controller 20 generates transmission power information (a transmission power value) that indicates transmission power of the reverse link data (the carrier) determined by the open loop control and the closed loop control. Here, the transmission power information (the transmission power value) is transmitted to the radio base station 100 which is connected to the radio communication terminal 10 via the carrier.

Note that a case where the radio communication terminal 10 is connected to a single radio base station 100 through the adjacent carriers (such as the carrier #1 and the carrier #2) will be explained below as an example. Moreover, the transmission power information (the transmission power value) includes information pieces respectively representing the transmission power of the adjacent carriers.

(Configuration of Radio Base Station)

Figure 4:
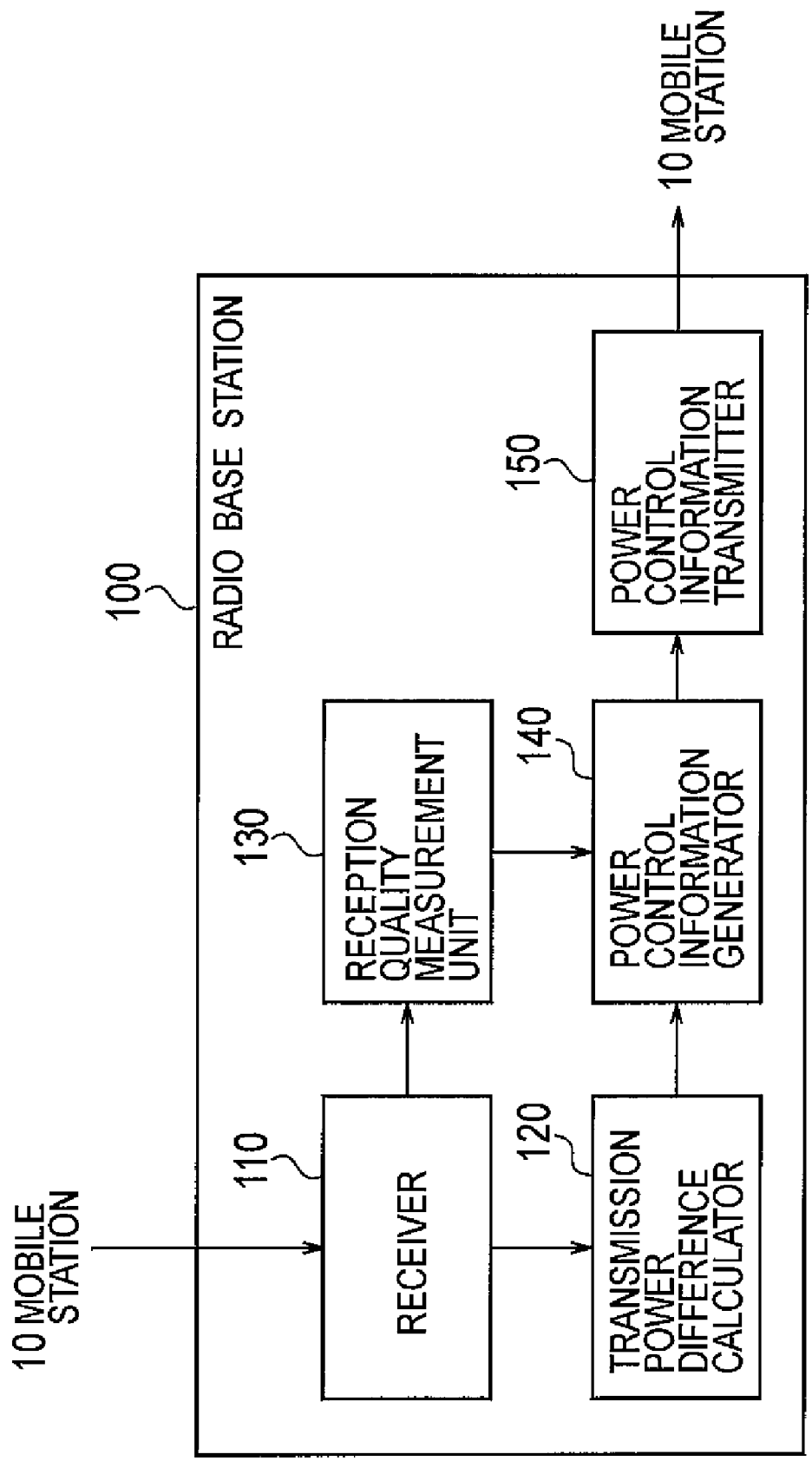
FIG. 4 is a functional block configuration diagram of a radio base station 100 according to the first embodiment of the present invention.

A configuration of the radio base station according to the first embodiment of the present invention will be described below with reference to the drawing. FIG. 4 is a functional block configuration diagram showing the radio base station 100 according to the first embodiment of the present invention.

As shown in FIG. 4, the radio base station 100 includes a receiver 110, a transmission power difference calculator 120, a reception quality measurement unit 130, a power control information generator 140, and a power control information transmitter 150.

The receiver 110 receives reverse link data via a carrier from the radio communication terminal 10 which is connected to the radio base station 100 through the carrier. Subsequently, the receiver 110 inputs the reverse link data received from the radio communication terminal 10 to the reception quality measurement unit 130.

Meanwhile, the receiver receives transmission power information (a transmission power value) of the carrier from the radio communication terminal 10 which is connected to the radio base station 100 through the carrier. Subsequently, the receiver 110 inputs the transmission power information (the transmission power value) received from the radio communication terminal 10 to the transmission power difference calculator 120.

The transmission power difference calculator 120 calculates a difference in the transmission power between the adjacent carriers (hereinafter a transmission power difference) on the basis of the transmission power information (the transmission power values) acquired from the receiver 110. Meanwhile, the transmission power difference calculator 120 determines whether or not the transmission power difference between the adjacent carriers exceeds a threshold set up on the basis of a maximum transmission power difference (MaxRLTxPwrDiff) allowable between the adjacent carriers. When the transmission power difference between the adjacent carriers exceeds the threshold set up on the basis of the maximum transmission power difference, the transmission power difference calculator 120 informs the power control information generator 140 of the fact that the transmission power difference between the adjacent carriers has exceeded the threshold set up on the basis of the maximum transmission power difference.

Here, the threshold to be set up on the basis of the maximum transmission power difference may be equal to the maximum transmission power difference itself or may be a value smaller than the maximum transmission power difference (such as a value obtained by multiplying the maximum transmission power difference by a predetermined ratio (0.9)).

The reception quality measurement unit 130 measures reception quality (SIR, for example) of the reverse link data acquired from the receiver 110. Meanwhile, the reception quality measurement unit 130 inputs the measured reception quality of the reverse link data (carrier) to the power control information generator 140.

The power control information generator 140 determines whether to give an instruction to increase the transmission power of the reverse link data (carrier) or to give an instruction to decrease the transmission power of the reverse link data (carrier) on the basis of the reception quality of the reverse link data acquired from the reception quality measurement unit 130. Subsequently, the power control information generator 140 generates power control information being an instruction to increase or decrease the transmission power of the reverse link data (carrier) on the basis of a judgment result based on the reception quality of the reverse link data, the power control information generated for each carrier.

Here, the power control information generator 140 stops generation of the power control information for a predetermined period when the fact that the transmission power difference between the adjacent carriers has exceeded the threshold set up on the basis of the maximum transmission power difference is informed, the power control information being an instruction to increase the transmission power of the carrier having higher transmission power out of the adjacent carriers.

Specifically, the power control information generator 140 sets a standby flag corresponding to the carrier having higher transmission power to "1" and sets up a predetermined waiting period to a standby timer corresponding to the carrier having higher transmission power, when the fact that the transmission power difference between the adjacent carriers has exceeded the threshold set up on the basis of the maximum transmission power difference is informed. Subsequently, the power control information generator 140 does not generate the power control information corresponding to the carrier when it is determined to give an instruction to increase the transmission power of the carrier the standby flag of which is set to "1".

Note that the standby flag and the standby timer are provided for each of the carriers connecting the radio communication terminal 10 to the radio base station 100. In the case of time-out of the standby timer set up with the predetermined waiting period, the standby flag is rewritten from "1" to "0". Meanwhile, the predetermined waiting period may be a preset period or a period to be determined by the radio base station 100 depending on the transmission power difference between the adjacent carriers.

Here, when the fact that the transmission power difference between the adjacent carriers has exceeded the threshold set up on the basis of the maximum transmission power difference is informed, the power control information generator 140 may stop generation of the power control information for the predetermined period, the power control information being an instruction to decrease the transmission power of the carrier having lower transmission power out of the adjacent carriers.

Meanwhile, when the fact that the transmission power difference between the adjacent carriers has exceeded the threshold set up on the basis of the maximum transmission power difference is informed, the power control information generator 140 may stop, for the predetermined period, both of generation of the power is control information being an instruction to increase the transmission power of the carrier having higher transmission power and generation of the power control information being an instruction to decrease the transmission power of the carrier having lower transmission power out of the adjacent carriers.

The power control information transmitter 150 transmits the power control information generated by the power control information generator 140 to the radio communication terminal 10 connected via the carrier corresponding to the power control information.

(Operation of Radio Communication Terminal)

Figure 5:
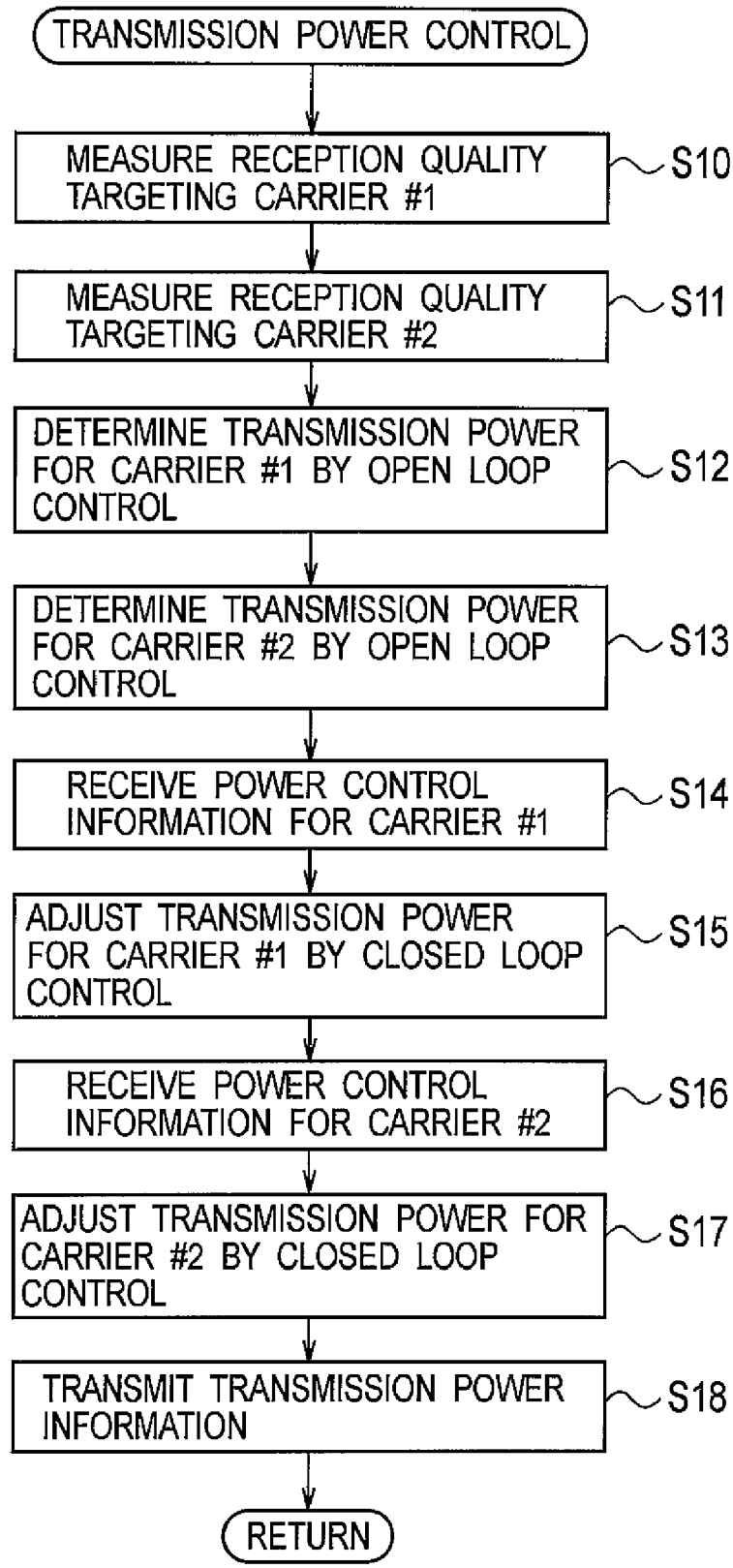
FIG. 5 is a flowchart showing an operation of the radio communication terminal 10 according to the first embodiment of the present invention.

The operation of the radio communication terminal according to the first embodiment of the present invention will be described hereinafter with reference to the drawings. FIG. 5 is a flowchart of the operation (main processing of controlling transmission power) of the radio communication terminal 10 according to the first embodiment of the present invention. Note that the main processing of controlling transmission power is repeatedly performed in a predetermined cycle.

In the following, a case where the adjacent carriers include the carrier #1 and the carrier #2 will be described as an example. In addition, the radio communication terminal 10 is assumed to transmit the reverse link data to the single radio base station 100 by using the carrier #1 and the carrier #2.

As shown in FIG. 5, in step 10, the radio communication terminal 10 measures reception quality of forward link data targeting the carrier #1. Specifically, the radio communication terminal 10 measures the reception quality of the forward link data received from the radio base station 100 to which the radio communication terminal 10 transmits the reverse link data by using the carrier #1.

In step 11, the radio communication terminal 10 measures reception quality of forward link data targeting the carrier #2. Specifically, the radio communication terminal 10 measures the reception quality of the forward link data received from the radio base station 100 to which the radio communication terminal 10 transmits the reverse link data by using the carrier #2.

In step 12, the radio communication terminal 10 determines transmission power of the reverse link data to be transmitted by using the carrier #1 through the open loop control. Specifically, the radio communication terminal 10 determines the transmission power of the reverse link data to be transmitted by using the carrier on the basis of the reception quality measured in step 10.

In step 13, the radio communication terminal 10 determines transmission power of the reverse link data to be transmitted by using the carrier #2 through the open loop control. Specifically, the radio communication terminal 10 determines the transmission power of the reverse link data to be transmitted by using the carrier #2 on the basis of the reception quality measured in step 11.

In step 14, the radio communication terminal 10 receives power control information for the carrier #1. Specifically, the radio communication terminal 10 receives the power control information from the radio base station 100 to which the radio communication terminal 10 transmits the reverse link data by using the carrier #1. Here, the power control information is the information generated by the radio base station 100 on the basis of the reception quality of the reverse link data to be transmitted by using the carrier #1.

In step 15, the radio communication terminal 10 adjusts the transmission power of the reverse link data to be transmitted by using the carrier #1 through the closed loop control. Specifically, the radio communication terminal 10 adjusts the transmission power of the reverse link data determined in step 12 on the basis of the power control information received in step 14.

That is, the radio communication terminal 10 transmits the reverse link data by using the carrier #1 at the transmission power determined by the open loop control and the closed loop control.

In step 16, the radio communication terminal 10 receives power control information for the carrier #2. Specifically, the radio communication terminal 10 receives the power control information from the radio base station 100 to which the radio communication terminal 10 transmits the reverse link data by using the carrier #2. Here, the power control information is the information generated by the radio base station 100 on the basis of the reception quality of the reverse link data to be transmitted by the carrier #2.

In step 17, the radio communication terminal 10 adjusts the transmission power of the reverse link data to be transmitted by using the carrier #2 through the closed loop control. Specifically, the radio communication terminal 10 adjusts the transmission power of the reverse link data determined in step 13 on the basis of the power control information received in step 16.

That is, the radio communication terminal 10 transmits the reverse link data by using the carrier #2 at the transmission power determined by the open loop control and the closed loop control.

In step 18, the radio communication terminal 10 transmits the transmission power information (the transmission power value) representing the transmission power of the carrier #1 and the transmission power information (the transmission power value) representing the transmission power of the carrier #2 to the radio base station 100.

(Operation of Radio Base Station)

Figure 6:
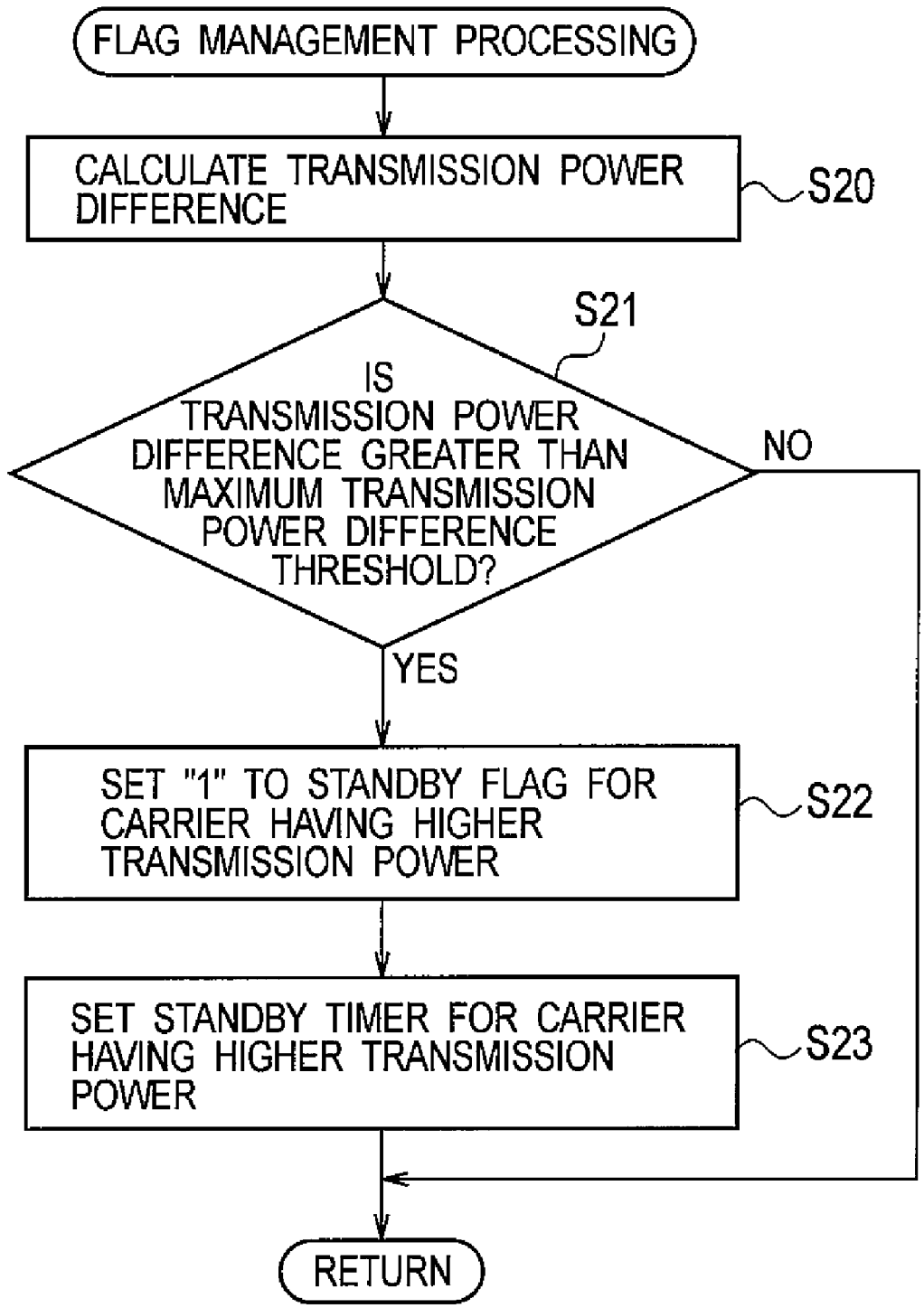
FIG. 6 is a flowchart showing an operation of the radio base station 100 according to the first embodiment of the present invention (Pattern 1).
Figure 7:
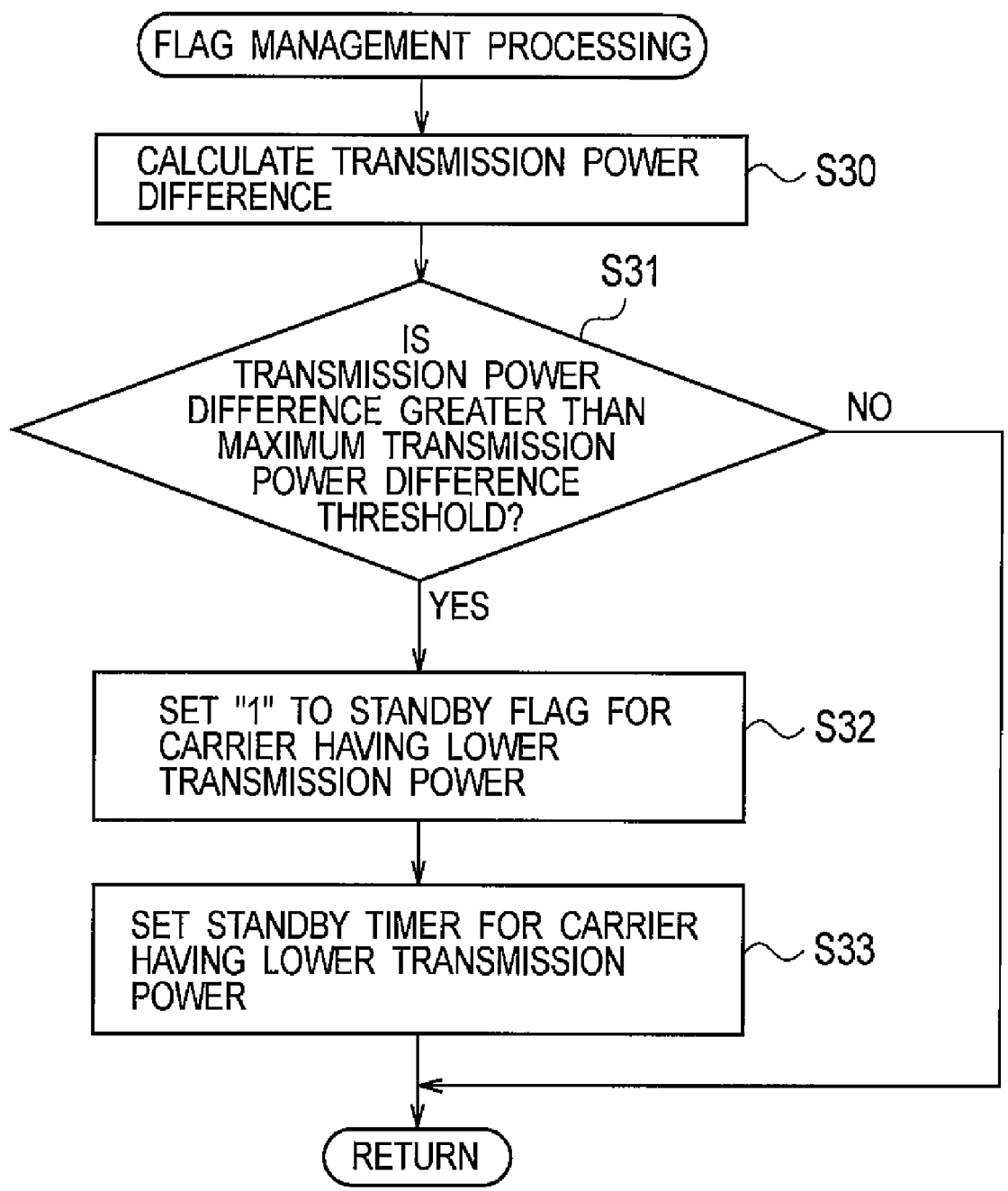
FIG. 7 is a flowchart showing the operation of the radio base station 100 according to the first embodiment of the present invention (Pattern 2).
Figure 8:
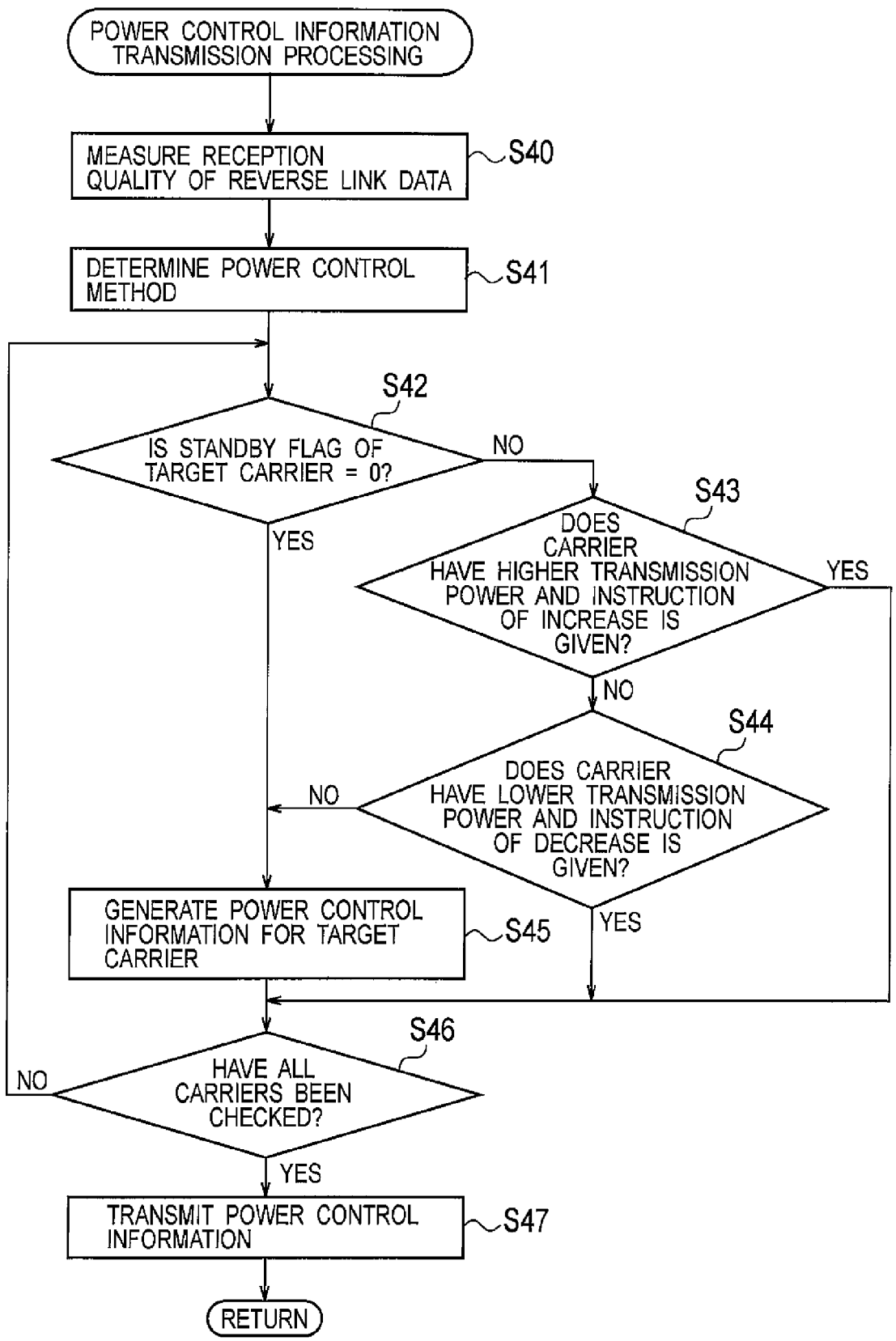
FIG. 8 is a flowchart showing the operation of the radio base station 100 according to the first embodiment of the present invention (Pattern 3).

The operation of the radio base station according to the first embodiment of the present invention will be described below with reference to the drawings. FIG. 6 to FIG. 8 are flowcharts showing the operation of the radio base station 100 according to the first embodiment of the present invention.

First, flag management processing (1) according to the first embodiment of the present invention will be described with reference to FIG. 6. Note that the standby flag and the standby timer for controlling generation and transmission of the power control information are set up in the flag management processing (1).

As shown in FIG. 6, in step 20, the radio base station 100 calculates the difference in the transmission power of the reverse link data (the transmission power difference) between the adjacent carriers (the carrier #1 and the carrier #2) on the basis of the transmission power information (the transmission power values) received from the radio communication terminal 10.

In step 21, the radio base station 100 determines whether or not the transmission power difference between the adjacent carriers exceeds the threshold that is set up on the basis of the maximum transmission power difference (MaxRLTxPwrDiff). The radio base station 100 proceeds to the processing in step 22 when the transmission power difference between the adjacent carriers exceeds the threshold set up on the basis of the maximum transmission power difference. Meanwhile, when the transmission power difference between the adjacent carriers does not exceed the threshold set up on the basis of the maximum transmission power difference, the radio base station 100 terminates the flag management processing (1).

Here, as described previously, the threshold to be set up on the basis of the maximum transmission power difference may be equal to the maximum transmission power difference or may be a value smaller than the maximum transmission power difference (such as a value obtained by multiplying the maximum transmission power difference by a predetermined ratio (0.9)).

In step 22, the radio base station 100 sets "1" to the standby flag corresponding to the carrier having higher transmission power out of the adjacent carriers.

In step 23, the radio base station 100 sets up a predetermined waiting period to the standby timer corresponding to the carrier having higher transmission power out of the adjacent carriers.

Here, the standby flag is rewritten from "1" to "0" in the case of time-out of the standby timer set up with the predetermined waiting period.

Next, flag management processing (2) according to the first embodiment of the present invention will be described with reference to FIG. 7. Here, as similar to the flag management processing (1), the standby flag and the standby timer for controlling generation and transmission of the power control information are set up in the flag management processing (2).

As shown in FIG. 7, in step 30, the radio base station 100 calculates the difference in the transmission power of the reverse link data (the transmission power difference) between the adjacent carriers (the carrier #1 and the carrier 42) on the basis of the transmission power information received from the radio communication terminal 10.

In step 31, the radio base station 100 determines whether or not the transmission power difference between the adjacent carriers exceeds the threshold that is set up on the basis of the maximum transmission power difference (MaxRLTxPwrDiff). The radio base station 100 proceeds to the processing in step 32 when the transmission power difference between the adjacent carriers exceeds the threshold set up on the basis of the maximum transmission power difference. Meanwhile, when the transmission power difference between the adjacent carriers does not exceed the threshold set up on the basis of the maximum transmission power difference, the radio base station 100 terminates the flag management processing (2).

Here, as described previously, the threshold to be set up on the basis of the maximum transmission power difference may be equal to the maximum transmission power difference or may be a value smaller than the maximum transmission power difference (such as a value obtained by multiplying the maximum transmission power difference by a predetermined ratio (0.9)).

In step 32, the radio base station 100 sets "1" to the standby flag corresponding to the carrier having lower transmission power out of the adjacent carriers.

In step 33, the radio base station 100 sets up a predetermined waiting period to the standby timer corresponding to the carrier having lower transmission power out of the adjacent carriers.

Here, the standby flag is rewritten from "1" to "0" in the case of time-out of the standby timer set up with the predetermined waiting period.

Lastly, power control information transmission processing according to the first embodiment of the present invention will is be described with reference to FIG. 8. Note that generation and transmission of the power control information used in the closed loop control are executed in the power control information transmission processing.

As shown in FIG. 8, in step 40, the radio base station 100 measures the reception quality (SIR, for example) of the reverse link data pieces which are received via the respective carriers.

In step 41, the radio base station 100 determines power control methods for the respective carriers on the basis of the reception quality measured in step 40. Specifically, when the reception quality falls below predetermined reception quality, the radio base station 100 determines an instruction to increase the transmission power of the carrier. On the contrary, when the reception quality is equal to or above the predetermined reception quality, the radio base station 100 determines an instruction to decrease the transmission power of the carrier.

In step 42, the radio base station 100 selects one carrier out of the multiple carriers connecting the radio communication terminal 10 to the radio base station 100 as a target carrier. Subsequently, the radio base station 100 determines whether or not the standby flag corresponding to the target carrier is set to "0". The radio base station 100 proceeds to the processing in step 45 when the standby flag is set to "0" or proceeds to the processing in step 43 when the standby flag is set to "1".

In step 43, the radio base station 100 determines whether or not the target carrier has higher transmission power and is included in the adjacent carriers and whether or not it is determined to give an instruction to increase the transmission power of the target carrier in step 41. The radio base station 100 proceeds to the processing in step 46 when the judgment result is "YES" or proceeds to the processing in step 44 when the judgment result is "NO".

In step 44, the radio base station 100 determines whether or not the target carrier has lower transmission power and is included in the adjacent carriers and whether or not it is determined to give an instruction to decrease the transmission power of the target carrier in step 41. The radio base station 100 proceeds to the processing in step 46 when the judgment result is "YES" or proceeds to the processing in step 45 when the judgment result is "NO".

In step 45, the radio base station 100 generates the power control information for the target carrier. Specifically, the radio base station 100 generates the power control information being an instruction to increase or decrease the transmission power of the target carrier in accordance with the power control method having determined in step 41.

In step 46, the radio base station 100 determines whether or not all the carriers connecting the radio communication terminal 10 to the radio base station 100 have been checked, that is, whether or not the processing from step 42 to step 44 has been carried out for all the carriers. The radio base station 100 proceeds to the processing in step 47 when all the carriers have been checked or returns to the processing in step 42 when all the carriers have not been checked.

In step 47, the radio base station 100 transmits the power control information having generated for each of the carriers in step 45 to the radio communication terminal 10 connected through the carrier.

(Action and Effect)

According to the radio base station 100 of the first embodiment of the present invention, the power control information generator 140 stops generation of the power control information for the predetermined period when the transmission power difference between the adjacent carries exceeds the threshold set up on the basis of the maximum transmission power difference (MaxRLTxPwrDiff), the power control information being an instruction to increase the transmission power of the carrier having higher transmission power out of the adjacent carries. Moreover, the power control information generator 140 stops generation of the power control information for the predetermined period when the transmission power difference between the adjacent carries exceeds the threshold set up on the basis of the maximum transmission power difference (MaxRLTxPwrDiff), the power control information being an instruction to decrease the transmission power of the carrier having lower transmission power out of the adjacent carries.

Accordingly, it is possible to suppress an increase or a decrease in the transmission power difference between the adjacent carriers. Accordingly, it is possible to maintain communications by multicarrier while suppressing interference between the adjacent carriers adjacent to each other with the predetermined frequency interval.

Second Embodiment

A second embodiment of the present invention will be described hereinafter. In the following, differences between the first embodiment described above and the second embodiment will be mainly described.

Specifically, in the above-described first embodiment, the radio base station 100 sets "1" to the standby flag corresponding to at least any one of the adjacent carriers when the transmission power difference between the adjacent carriers exceeds the threshold set up on the basis of the maximum transmission power difference.

On the other hand, in the second embodiment, the radio base station 100 determines whether or not the transmission power difference between the adjacent carriers exceeds an estimated curve difference threshold. Then, the radio base station 100 sets "1" to the standby flag corresponding to at least any one of the adjacent carriers when the transmission power difference between the adjacent carriers exceeds the estimated curve difference threshold and when the transmission power difference between the adjacent carriers exceeds the threshold set up on the basis of the maximum transmission power difference.

(Configuration of Radio Base Station)

Figure 9:
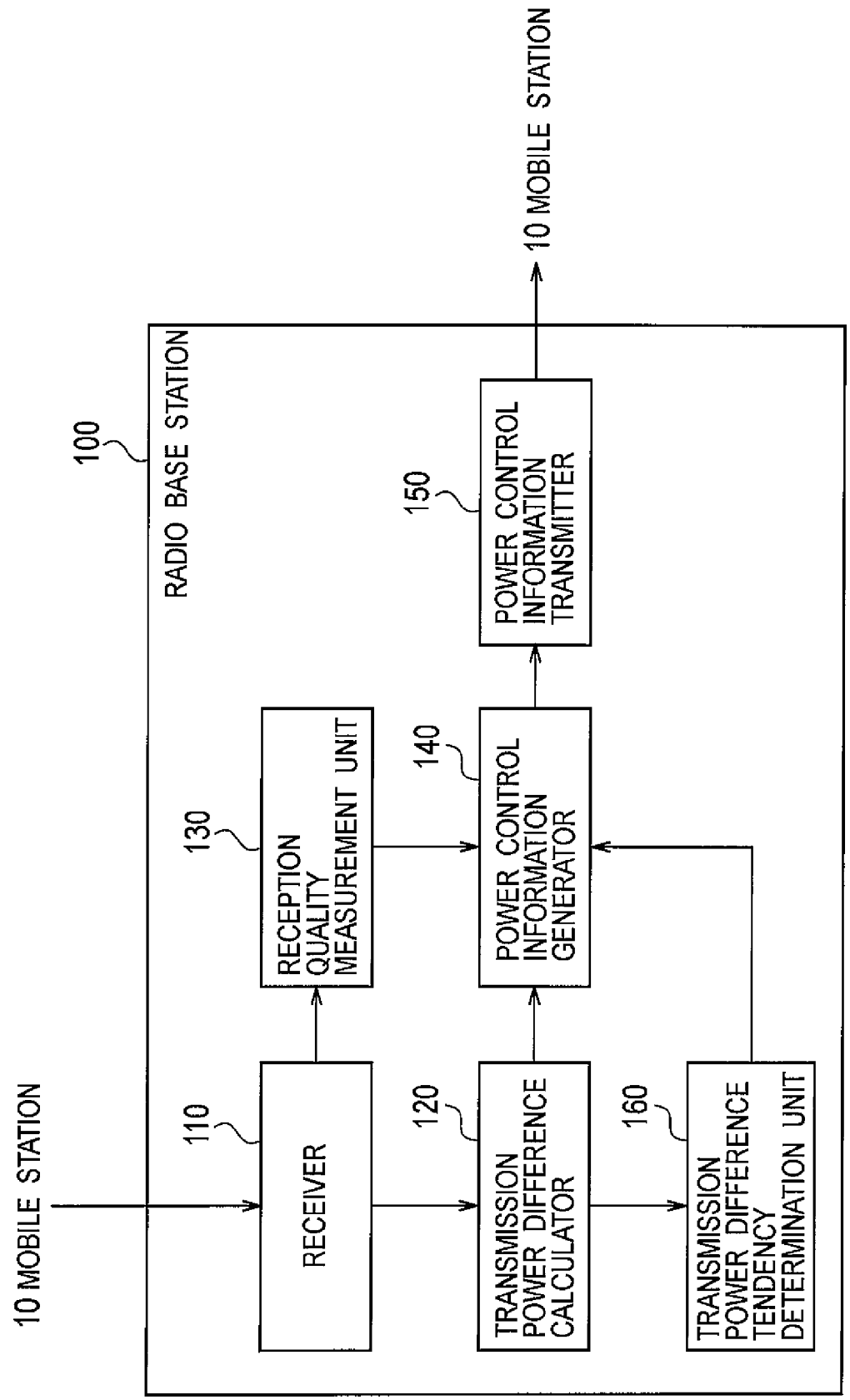
FIG. 9 is a functional block configuration diagram of a radio base station 100 according to a second embodiment of the present invention.

A configuration of the radio base station according to the second embodiment of the present invention will be described is hereinafter with reference to the drawings. FIG. 9 is a functional block configuration diagram showing the radio base station 100 according to the second embodiment of the present invention. It should be noted that in FIG. 9, similar reference numerals are assigned to the configuration similar to FIG. 4.

As shown in FIG. 9, the radio base station 100 includes a transmission power difference determination unit 160 in addition to the receiver 110, the transmission power difference calculator 120, the reception quality measurement unit 130, the power control information generator 140, and the power control information transmitter 150.

The transmission power difference calculator 120 calculates a transmission power difference between adjacent carriers in a predetermined cycle (cycle in which the receiver 110 receives transmission power information, for example).

The transmission power difference determination unit 160 determines whether or not the transmission power difference between the adjacent carriers increases, the difference calculated by the transmission power difference calculator 120 in the predetermined cycle. Specifically, on the basis of the transmission power of the reverse link data, the transmission power difference determination unit 160 calculates an expression of an estimated curve (hereinafter referred to as an estimated curve expression) for each of the adjacent carriers, the estimated curve expression showing a state in which transmission power of the reverse link data changes on the time axis. Subsequently, the transmission power difference determination unit 160 determines whether or not a difference in values calculated by the respective estimated curve expressions (hereinafter referred to as an estimated curve difference) at a predetermined time exceeds an estimated curve difference threshold over a predetermined period. When the estimated curve difference between the adjacent carriers exceeds the estimated curve threshold over the predetermined period, the transmission power difference determination unit 160 informs the power control information generator 140 of the fact that the estimated curve difference between the adjacent carriers exceeds the estimated curve threshold over the predetermined period.

Figure 10:
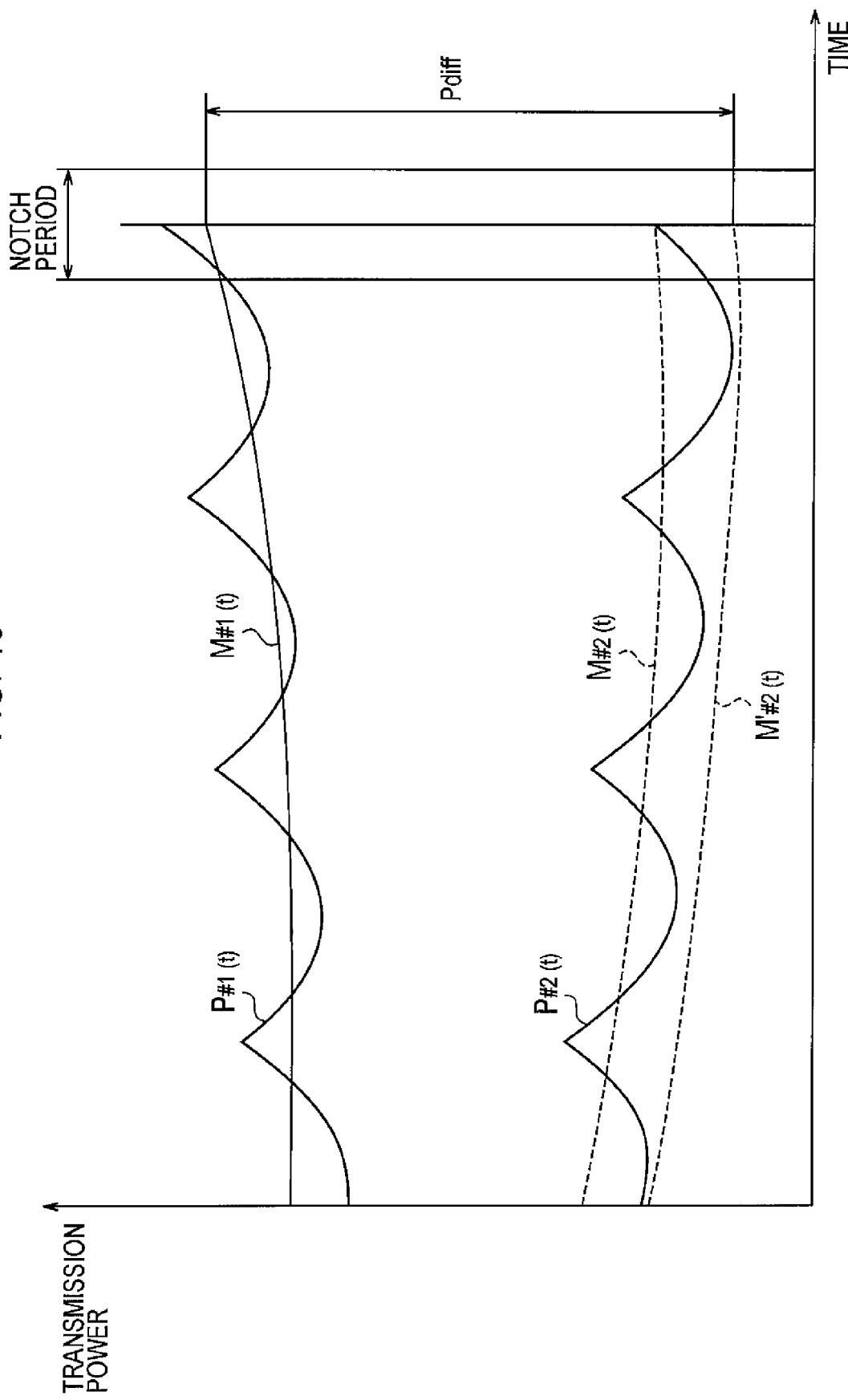
FIG. 10 is a view for explaining calculation of estimated curve differences (differences of values calculated by estimated curve expressions of respective carriers) according to the second embodiment of the present invention.

For example, using the case where adjacent carriers are a carrier #1 and a carrier #2 as an example, the procedure for calculating an estimated curve difference between the carrier #1 and the carrier #2 will be described with reference to FIG. 10. Hereinafter, considered is the case where transmission power of the carrier #1 is larger than that of the carrier #2.

Here, a notch period is determined by notch intervals calculated on the basis of reception strength and reception quality (SIR). Specifically, the notch period includes a notch interval before a peak point and a notch interval after the peak point of a transmission power estimated curve. Here, when the estimated curve difference between the adjacent carriers exceeds an estimated curve threshold throughout a predetermined period within the notch period, the radio base station 100 sets "1" to the standby flag corresponding to at least any one of the adjacent carriers.

Specifically, when the transmission power of the carrier #1 at time t is set as "P#1(t)", an estimated curve expression "M#1(t)" of the carrier #1 is calculated by the following expression (1) where α is a coefficient corresponding to the carrier #1:

[Formula 1]

$$M_{\#1}(t) = \alpha \times P_{\#1}(t) + (1-\alpha) \times M_{\#1}(t-\Delta t) \qquad \text{Expression (1)}.$$

On the other hand, when the transmission power of the carrier #2 at the time t is set as "P#2(t)", an estimated curve expression "M#2(t)" of the carrier #2 is calculated by the following expression (2) where β is a coefficient corresponding to the carrier #2:

[Formula 2]

$$M_{\#2}(t) = \beta \times P_{\#2}(t) + (1-\beta) \times M_{\#2}(t-\Delta t) \qquad \text{Expression (2)}.$$

Furthermore, for the carrier #2 having lower transmission power, a lower estimated curve "M'#2(t)" of the carrier #2 is calculated by the following expression (3):

[Formula 3]

$$M'_{\#2}(t) = M_{\#2}(t) - \max\{M_{\#2}(t+\Delta t) - P_{\#2}(t+\Delta t)\} \quad \text{Expression (3)}.$$

In addition, at the time t, a difference (estimated curve difference "Pdiff") between a value calculated by the estimated curve expression of the carrier #1 and a value calculated by the lower estimated curve expression of the carrier #2 is calculated by the following expression (4):

[Formula 4]

$$P_{diff} = M_{\#1}(t) - M'_{\#2}(t) \quad \text{Expression (4)}.$$

Subsequently, the transmission power difference determination unit 160 determines whether or not the estimated curve difference "Pdiff" calculated by the expression (1) to the expression (4) exceeds the estimated curve difference threshold (Pthresh) for a predetermined period.

It is needless to say that an estimated curve difference "Pdiff" may simply be a difference between a value calculated by the estimated curve expression "M#1(t)" expression and a value calculated by the estimated curve expression "M#2(t)" expression, not a difference between the value calculated by the estimated curve expression "M#1(t)" expression and a value calculated by the lower estimated curve expression "M'#2(t)" expression.

Here, the transmission power difference determination unit 160 may determine whether or not the estimated curve difference "Pdiff" exceeds the estimated curve difference threshold (Pthresh) in the notch period.

When the fact that the estimated curve difference between the adjacent carriers exceeds the estimated curve threshold throughout the predetermined period and the transmission power difference between the adjacent carriers has exceeded the threshold set up on the basis of the maximum transmission power difference is informed, the power control information generator 140 sets "1" to the standby flag corresponding to at least any one of the adjacent carriers.

(Operation of Radio Base Station)

Figure 11:
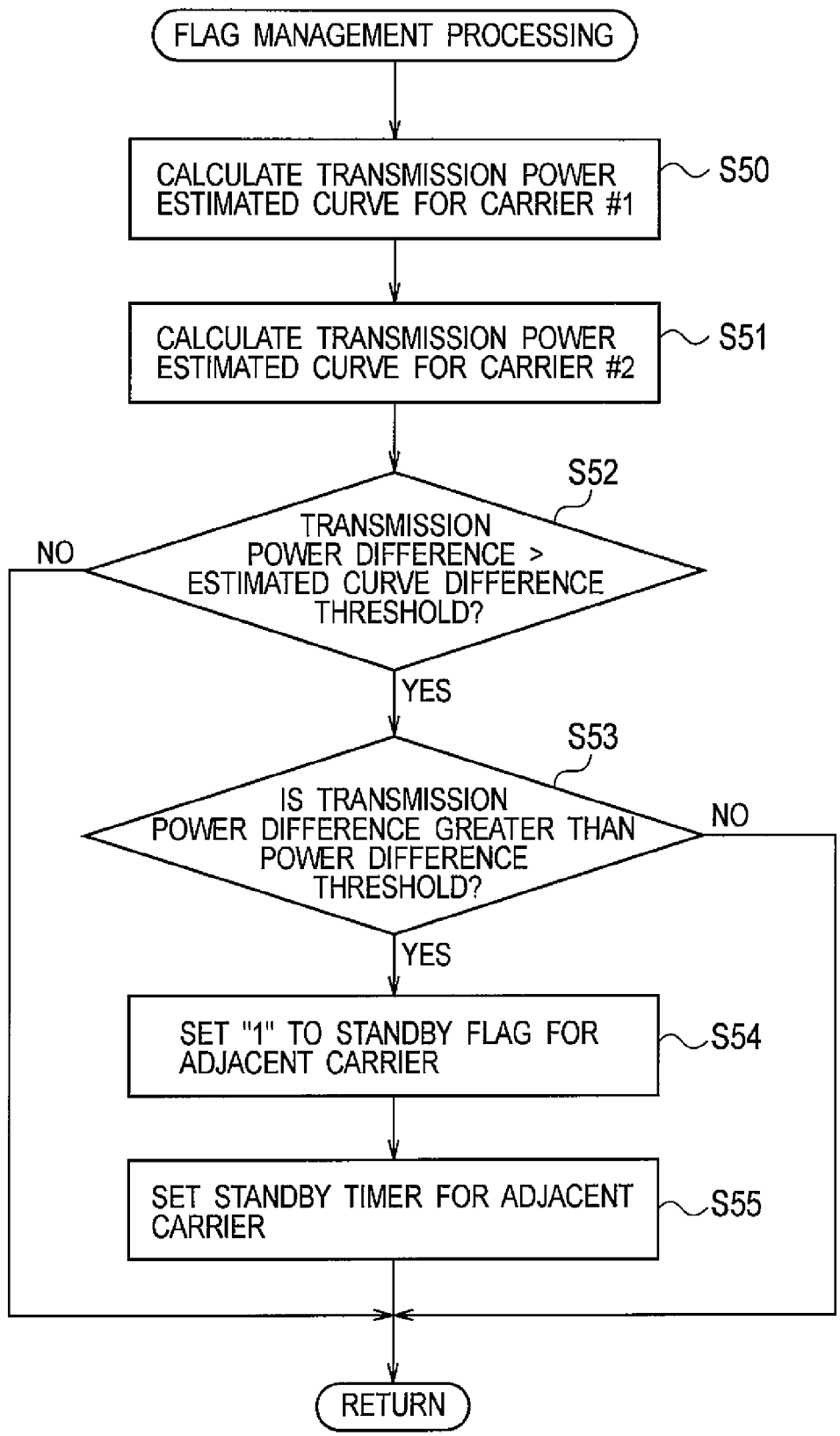
FIG. 11 is a flowchart showing an operation of the radio base station 100 according to the second embodiment of the present invention.

The operation of the radio base station according to the second embodiment of the present invention will be described below with reference to the drawings. FIG. 11 is a flowchart showing the operation of the radio base station 100 according to the second embodiment of the present invention. Note that the flag management processing shown in FIG. 11 is executed instead of the above-described flag management processing shown in FIG. 6 and FIG. 7.

In the following, as similar to the above-described first embodiment, a case where the adjacent carriers include the carrier #1 and the carrier #2 will be described as an example. Moreover, the radio communication terminal 10 is assumed to transmit the reverse link data to the radio base station 100 by using the carrier #1 and the carrier #2. In addition, the transmission power of the carrier #1 is assumed to be larger than the transmission power of the carrier #2.

As shown in FIG. 11, in step 50, the radio base station 100 receives the transmission power information that indicates the transmission power of the carrier #1 from the radio communication terminal 10. Subsequently, the radio base station 100 calculates an estimated curve expression of the carrier #1 on the basis of the transmission power of the reverse link data transmitted via the carrier #1 having higher transmission power.

In step 51, the radio base station 100 receives the transmission power information that indicates the transmission power of the carrier #2 from the radio communication terminal 10. Subsequently, the radio base station 100 calculates an estimated curve expression (or a lower estimated curve expression) of the carrier #2 on the basis of the transmission power of the reverse link data transmitted via the carrier #2 having lower transmission power.

In step 52, the radio base station 100 determines whether or not the transmission power difference between the carrier #1 and the carrier #2 exceeds the estimated curve difference threshold on the basis of the estimated curve expression of the carrier #1 calculated in step 50 and the estimated curve expression (or the lower estimated curve expression) of the carrier #2 calculated in step 51. Specifically, the radio base station 100 calculates a difference (the estimated curve difference) between a value calculated by the estimated curve expression of the carrier #1 and a value calculated by the estimated curve expression (or the lower estimated curve expression) of the carrier #2. Subsequently, the radio base station 100 determines whether or not the estimated curve difference exceeds the estimated curve difference threshold throughout the predetermined period.

The radio base station 100 proceeds to the processing in step 53 when the estimated curve difference exceeds the estimated curve difference threshold throughout the predetermined period. Meanwhile, when the estimated curve difference does not exceed the estimated curve difference threshold throughout the predetermined period, the radio base station 100 terminates the flag management processing.

In step 53, the radio base station 100 determines whether or not the transmission power difference between the carrier #1 and the carrier #2 exceeds the threshold set up on the basis of the maximum transmission power difference. The radio base station 100 proceeds to the processing in step 54 when the transmission power difference exceeds the threshold set up on the basis of the maximum transmission power difference. Meanwhile, when the transmission power difference does not exceed the threshold set up on the basis of the maximum transmission power difference, the radio base station 100 terminates the flag management processing.

In step 54, the radio base station 100 sets "1" to the standby flag corresponding to at least any one carrier out of the adjacent carriers.

In step 55, the radio base station 100 sets up a predetermined waiting period to the standby timer corresponding to the carrier the standby flag of which is set to "1" in step 54.

Here, as described above, the standby flag is rewritten from "1" to "0" in the case of time-out of the standby timer set up with the predetermined waiting period.

(Action and Effect)

According to the radio base station 100 of the second embodiment of the present invention, the power control information generator 140 sets "1" to the standby flag corresponding to at least any one of the adjacent carriers not merely in the case where the transmission power difference between the adjacent carriers exceeds the threshold set up on the basis of the maximum transmission power difference but in the case where the transmission power difference between the adjacent carriers exceeds the estimated curve difference threshold and the transmission power difference between the adjacent carriers exceeds the threshold set up on the basis of the maximum transmission power difference.

Here, there may be a case where the transmission power of the carrier temporarily increases due to the open loop control or the closed loop control in association with deterioration in the reception quality influenced by fading or the like, for example. In such a case, even if the transmission power difference between the adjacent carriers temporarily exceeds the threshold set up on the basis of the maximum transmission power difference, it is highly likely that the transmission power difference between the adjacent carriers will fall within the maximum transmission power difference as long as the influence by fading or the like disappears.

In this manner, according to the second embodiment of the present invention, it is possible to suppress unnecessary stopping of transmission of the power control information when the transmission power difference between the adjacent carriers temporarily exceeds the threshold set up on the basis of the maximum transmission power difference.

Third Embodiment

A third embodiment of the present invention will be described hereinafter. In the following, differences between the first embodiment described above and the third embodiment will be mainly described.

Specifically, in the above-described first embodiment, the radio base station 100 determines whether or not to stop transmission of the power control information.

On the other hand, in the third embodiment, the base station controller 200 determines whether or not to stop transmission of the power control information. When determining stopping transmission of the power control information, the base station controller 200 instructs the radio base station 100 to stop transmission of the power control information.

(Configuration of Base Station Controller)

A configuration of the base station controller according to the third embodiment of the present invention will be described below with reference to the drawing. FIG. 12 is a functional block configuration diagram showing the base station controller 200 according to the third embodiment of the present invention.

As shown in FIG. 12, the base station controller 200 includes a transmission power information receiver 210, a transmission power difference calculator 220, and a transmission stopping instructor 230.

The transmission power information receiver 210 receives the transmission power information pieces respectively representing the transmission power of the adjacent carriers (the reverse link data) from the radio base station 100.

For instance a case in which the radio communication terminal 10 is connected to a radio base station 100a through the carrier #1 while the radio communication terminal 10 is connected to a radio base station 100b through the carrier #2 will be described below as an example. The transmission power information receiver 210 receives the transmission power information representing the transmission power of the carrier 41 from the radio base station 100a, and receives the transmission power information representing the transmission power of the carrier #2 from the radio base station 100b.

Note that the transmission power information receiver 210 may receive the transmission power information pieces respectively representing the transmission power of the carrier #1 and the carrier #2 in a lump from the radio base station 100a. Similarly, the transmission power information receiver 210 may receive the transmission power information pieces respectively representing the transmission power of the carrier #1 and the carrier #2 in a lump from the radio base station 100b.

The transmission power difference calculator 220 calculates a difference in transmission power between the adjacent carriers (hereinafter a transmission power difference) on the basis of the transmission power information received by the transmission power information receiver 210. Meanwhile, the transmission power difference calculator 220 determines whether or not the transmission power difference between the adjacent carriers exceeds the threshold set up on the basis of the maximum transmission power difference (MaxRLTxPwrDiff) allowable between the adjacent carriers. When the transmission power difference between the adjacent carriers exceeds the threshold set up on the basis of the maximum transmission power difference, the transmission power difference calculator 220 informs the transmission stopping instructor 230 of the fact that the transmission power difference between the adjacent carriers has exceeded the threshold set up on the basis of the maximum transmission power difference.

When the fact that the transmission power difference between the adjacent carriers has exceeded the threshold set upon the basis of the maximum transmission power difference is informed, the transmission stopping instructor 230 instructs the radio base station 100 to stop transmission of the power control information being an instruction to increase the transmission power of the carrier having higher transmission power, the radio base station 100 connected to the radio communication terminal 10 via the carrier having higher transmission power out of the adjacent carriers.

Meanwhile, when the fact that the transmission power difference between the adjacent carriers has exceeded the threshold set up on the basis of the maximum transmission power difference is informed, the transmission stopping instructor 230 may instruct the radio base station 100 to stop transmission of the power control information being an instruction to decrease the transmission power of the carrier having lower transmission power, the radio base station 100 connected to the radio communication terminal 10 via the carrier having lower transmission power out of the adjacent carriers.

The radio base station 100 thus instructed by the base station controller 200 to stop transmission of the power control information stops, for a predetermined stopping period, transmission of the power control information being an instruction to increase the transmission power difference between the adjacent carriers.

Note that the predetermined stopping period may be a preset period or a period to be determined by the base station controller 200 depending on the transmission power difference between the adjacent carriers.

(Action and Effect)

According to the base station controller 200 of the third embodiment of the present invention, the transmission stopping instructor 230 gives an instruction to stop transmission of the power control information being an instruction to increase the transmission power difference between the adjacent carriers when the fact that the transmission power difference between the adjacent carriers has exceeded the threshold set up on the basis of the maximum transmission power difference is informed.

Thus, it is possible to maintain communications by multi-carrier while suppressing interference between the adjacent carriers adjacent to each other with the predetermined frequency interval.

Meanwhile, even when the radio communication terminal 10 is connected to the different radio base stations 100 via the adjacent carriers, the base station controller 200 respectively instructs the radio base stations 100 to stop transmission of the power control information. Accordingly, it is possible to maintain communications by multicarrier while suppressing interference between the adjacent carriers.

Other Embodiments

As described above, contents of the present invention have been disclosed through the embodiment of the present invention. However, it should not be construed that the description and drawings constituting a part of this disclosure will limit the present invention. Various alternative embodiments will be apparent to those skilled in the art from this disclosure.

For example, in the first embodiment to the third embodiment described above, the standby flag corresponding to at least any one of the adjacent carriers is set to "1" on the basis of whether or not the transmission power difference between the adjacent carriers exceeds the threshold set up on the basis of the maximum transmission power difference. However, the present invention is not limited to this.

Specifically, the standby flag corresponding to at least any one of the adjacent carriers may be set to "1" on the basis of whether or not a transmission power difference between two carriers not being adjacent to each other exceeds a predetermined threshold.

In this case, a predetermined threshold is defined in accordance with the distance between the center frequencies of the two carriers being apart from each other. Specifically, as the center frequencies of the two carriers are apart from each other farther, the two carriers interfere with each other to a lower extent. Thus, the predetermined threshold is defined at a low value.

Meanwhile, the operation of the radio base stations 100 according to the first embodiment and the second embodiment described above may be provided in the form of a program executable on a computer.

Further, in the first embodiment and the second embodiment described above, the standby flag is rewritten from "1" to "0" in the case of time-out of the standby timer set up with the predetermined waiting period. However, the present invention is not limited to this. Specifically, the standby flag may be rewritten from "1" to "0" when the transmission power difference becomes smaller than the threshold set up on the basis of the maximum transmission power difference (MaxRLTxPwrDiff) (when determined as "NO" in step 21, step 31, and step 53 described above, for example).

Although the example of connecting the radio communication terminal to the single radio base station by using the carrier #1 and the carrier #2 has been described above, the present invention is not limited to this. The present invention is also applicable to a case in which a radio communication terminal is connected to multiple radio base stations by using the carrier 41 and the carrier #2. In this case, the transmission power information (the transmission power value) is transmitted to each of the radio base stations and each of the radio base stations executes the control as shown in the first embodiment and the second embodiment.

Further, in the first embodiment and the second embodiment described above, the radio base station stops transmission of the power control information when the transmission power difference between the adjacent carriers exceeds the threshold set up on the basis of the maximum transmission power difference. However, the present invention is not limited to this.

Specifically, in the power control information transmission processing, the radio base station may ask the base station controller for handoff of any one carrier out of the adjacent carriers instead of stopping transmission of the power control information, when the transmission power difference between the adjacent carriers exceeds the threshold set up on the basis of the maximum transmission power difference. Alternatively, in the power control information transmission processing, the radio base station may disconnect any one carrier out of the adjacent carriers instead of stopping transmission of the power control information, when the transmission power difference between the adjacent carriers exceeds the threshold set up on the basis of the maximum transmission power difference. Further, in the power control information transmission processing, the radio base station may also disconnect the carrier having higher transmission power out of the adjacent carriers and transmit the power control information being an instruction to decrease the transmission power of the carrier having lower transmission power instead of stopping transmission of the power control information, when the transmission power difference between the adjacent carriers exceeds the threshold set up on the basis of the maximum transmission power difference.

In this way, it is needless to say that the present invention contains various embodiments that have not been described herein. Thus, a technical scope of the present invention shall be defined only by inventive specific matters according to the claims that are reasonable from the above description.

Note that the entire contents of Japanese Patent Application No. 2006-207252 (filed on Jul. 28, 2006) are incorporated herein by reference in this description.

INDUSTRIAL APPLICABILITY

As has been described above, the radio communication method and the radio communication terminals according to the present invention can maintain communications by multicarrier while controlling interference between adjacent carries which are adjacent to each other with a predetermined frequency interval. Accordingly, they are useful in radio communications such as mobile communications.

The invention claimed is:

1. A radio communication method in reverse link by multicarrier using at least a first carrier and a second carrier adjacent to the first carrier with a predetermined frequency interval, the method comprising the steps of:
   generating power control information being an instruction to increase or decrease transmission power of the first carrier on the basis of reception quality of reverse link data using the first carrier, and transmitting the generated power control information to a radio communication terminal connected via the first carrier;
   generating power control information being an instruction to increase or decrease transmission power of the second carrier on the basis of reception quality of reverse link data using the second carrier, and transmitting the generated power control information to a radio communication terminal connected via the second carrier;
   acquiring a transmission power value of the first carrier from the radio communication terminal connected via the first carrier;
   acquiring a transmission power value of the second carrier from the radio communication terminal connected via the second carrier;
   calculating a transmission power difference between the first carrier and the second carrier on the basis of the transmission power value of the first carrier and the transmission power value of the second carrier; and
   determining whether or not the transmission power difference exceeds a threshold set up on the basis of a maximum transmission power difference allowable between the first carrier and the second carrier, wherein in the steps of transmitting the power control information, transmission of the power control information being an instruction to increase the transmission power of the carrier having higher transmission power out of the first carrier and the second carrier is stopped when the transmission power difference exceeds the threshold set up on the basis of the maximum transmission power difference.

2. The radio communication method according to claim 1, wherein the transmission power difference is calculated in a predetermined cycle in the step of calculating the transmission power difference, the radio communication method further comprises the step of determining whether or not the transmission power difference is increasing, on the basis of the transmission power difference calculated in the predetermined cycle, and in the steps of transmitting the power control information, transmission of the power control information being an instruction to increase the transmission power of the carrier having higher transmission power is stopped when it is determined that the transmission power difference is increasing.

3. A radio communication method in reverse link by multicarrier using at least a first carrier and a second carrier adjacent to the first carrier with a predetermined frequency interval, the method comprising the steps of:

generating power control information being an instruction to increase or decrease transmission power of the first carrier on the basis of reception quality of reverse link data using the first carrier, and transmitting the generated power control information to a radio communication terminal connected via the first carrier;

generating power control information being an instruction to increase or decrease transmission power of the second carrier on the basis of reception quality of reverse link data using the second carrier, and transmitting the generated power control information to a radio communication terminal connected via the second carrier;

acquiring a transmission power value of the first carrier from the radio communication terminal connected via the first carrier;

acquiring a transmission power value of the second carrier from the radio communication terminal connected via the second carrier;

calculating a transmission power difference between the first carrier and the second carrier on the basis of the transmission power value of the first carrier and the transmission power value of the second carrier; and determining whether or not the transmission power difference exceeds a threshold set up on the basis of a maximum transmission power difference allowable between the first carrier and the second carrier, wherein in the steps of transmitting the power control information, transmission of the power control information being an instruction to decrease the transmission power of the carrier having lower transmission power out of the first carrier and the second carrier is stopped when the transmission power difference exceeds the threshold set up on the basis of the maximum transmission power difference.

4. The radio communication method according to claim 3, wherein the transmission power difference is calculated in a predetermined cycle in the step of calculating the transmission power difference, the radio communication method further comprises the step of determining whether or not the transmission power difference is increasing, on the basis of the transmission power difference calculated in the predetermined cycle, and in the steps of transmitting the power control information, transmission of the power control information being an instruction to decrease the transmission power of the carrier having lower transmission power is stopped when it is determined that the transmission power difference is increasing.

5. A radio base station connected to radio communication terminals by multicarrier using at least a first carrier and a second carrier adjacent to the first carrier with a predetermined frequency interval, the radio base station comprising;

a first transmitter configured to generate power control information being an instruction to increase or decrease transmission power of the first carrier on the basis of reception quality of reverse link data using the first carrier, and to transmit the generated power control information to any of the radio communication terminals connected via the first carrier;

a second transmitter configured to generate power control information being an instruction to increase or decrease transmission power of the second carrier on the basis of reception quality of reverse link data using the second carrier, and to transmit the generated power control information to any of the radio communication terminals connected via the second carrier;

an acquisition unit configured to acquire a transmission power value of the first carrier from the radio communication terminal connected via the first carrier, and to acquire a transmission power value of the second carrier from the radio communication terminal connected via the second carrier;

a transmission power difference calculator configured to calculate a transmission power difference between the first carrier and the second carrier on the basis of the transmission power value of the first carrier and the transmission power value of the second carrier; and a transmission power difference determination unit configured to determine whether or not the transmission power difference calculated by the transmission power difference calculator exceeds a threshold set up on the basis of a maximum transmission power difference allowable between the first carrier and the second carrier, wherein any of the first transmitter and the second transmitter stops transmission of the power control information being an instruction to increase the transmission power of the carrier having higher transmission power when the transmission power difference exceeds the threshold set up on the basis of the maximum transmission power difference.

6. The radio base station according to claim 5, wherein the transmission power difference calculator calculates the transmission power difference in a predetermined cycle, the radio base station further comprises a power difference determination unit which determines whether or not the transmission power difference is increasing, on the basis of the transmission power difference calculated in the predetermined cycle by the transmission power difference calculator, and any of the first transmitter and the second transmitter stops transmission of the power control information being an instruction to increase the transmission power of the carrier having higher transmission power when it is determined by the power difference determination unit that the transmission power difference is increasing.

7. A radio base station connected to radio communication terminals by multicarrier using at least a first carrier and a second carrier adjacent to the first carrier with a predetermined frequency interval, the radio base station comprising:
- a first transmitter configured to generate power control information being an instruction to increase or decrease transmission power of the first carrier on the basis of reception quality of reverse link data using the first carrier, and to transmit the generated power control information to any of the radio communication terminals connected via the first carrier;
- a second transmitter configured to generate power control information being an instruction to increase or decrease transmission power of the second carrier on the basis of reception quality of reverse link data using the second carrier, and to transmit the generated power control information to any of the radio communication terminals connected via the second carrier;
- an acquisition unit configured to acquire a transmission power value of the first carrier from the radio communication terminal connected via the first carrier, and to acquire a transmission power value of the second carrier from the radio communication terminal connected via the second carrier;
- a transmission power difference calculator configured to calculate a transmission power difference between the first carrier and the second carrier on the basis of the transmission power value of the first carrier and the transmission power value of the second carrier; and
- a transmission power difference determination unit configured to determine whether or not the transmission power difference calculated by the transmission power difference calculator exceeds a threshold set up on the basis of a maximum transmission power difference allowable between the first carrier and the second carrier, wherein
- any of the first transmitter and the second transmitter stops transmission of the power control information being an instruction to decrease the transmission power of the carrier having lower transmission power when the transmission power difference exceeds the threshold set up on the basis of the maximum transmission power difference.

8. The radio base station according to claim 7,
wherein the transmission power difference calculator calculates the transmission power difference in a predetermined cycle,
the radio base station further comprises a power difference determination unit which determines whether or not the transmission power difference is increasing on the basis of the transmission power difference calculated in the predetermined cycle by the transmission power difference calculator, and
any of the first transmitter and the second transmitter stops transmission of the power control information being an instruction to decrease the transmission power of the carrier having lower transmission power when it is determined by the power difference determination unit that the transmission power difference is increasing.

* * * * *